(12) United States Patent
Laroche et al.

(10) Patent No.: US 10,178,405 B2
(45) Date of Patent: Jan. 8, 2019

(54) ENHANCED CODING AND DECODING USING INTRA BLOCK COPY MODE

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 15/173,464

(22) Filed: Jun. 3, 2016

(65) Prior Publication Data

US 2016/0360224 A1  Dec. 8, 2016

(30) Foreign Application Priority Data

Jun. 8, 2015  (GB) .................................. 1509930.2

(51) Int. Cl.
*H04N 19/593*  (2014.01)
*H04N 19/52*  (2014.01)
*H04N 19/176*  (2014.01)
*H04N 19/119*  (2014.01)

(52) U.S. Cl.
CPC ........... *H04N 19/52* (2014.11); *H04N 19/119* (2014.11); *H04N 19/176* (2014.11); *H04N 19/593* (2014.11)

(58) Field of Classification Search
None
See application file for complete search history.

(56) References Cited

U.S. PATENT DOCUMENTS

| 2009/0310685 | A1* | 12/2009 | Schmidt | H04N 19/176 |
| | | | | 375/240.24 |
| 2013/0107952 | A1* | 5/2013 | Coban | H04N 19/105 |
| | | | | 375/240.12 |
| 2014/0301465 | A1 | 10/2014 | Kwon | |
| 2015/0023406 | A1* | 1/2015 | Lee | H04N 19/46 |
| | | | | 375/240.02 |
| 2015/0055703 | A1* | 2/2015 | Pang | H04N 19/176 |
| | | | | 375/240.12 |
| 2016/0227221 | A1* | 8/2016 | Lai | H04N 19/107 |
| 2016/0241868 | A1* | 8/2016 | Li | H04N 19/56 |
| 2016/0295225 | A1* | 10/2016 | Takano | H04N 19/43 |

(Continued)

OTHER PUBLICATIONS

Joshi, et al., High Efficiency Video Coding (HEVC) Screen Content Coding: Draft, JCTVC-S1005, Oct. 2014 Meeting, Strasbourg, FR.*

(Continued)

*Primary Examiner* — Michael J Hess
(74) *Attorney, Agent, or Firm* — Canon USA, Inc. I.P. Division

(57) ABSTRACT

A decoding method wherein a motion vector is associated with a block of pixels of a current image,
wherein the image is subdivided into spatial subdivisions,
wherein the block of pixels belongs to a current spatial subdivision and is to be predicted using an Intra Block Copy mode, using a predictor block of pixels of the image designated by the motion vector, and
wherein the predictor block designated by the motion vector may belong to any one of previously decoded spatial subdivisions in the current image.
Embodiments provide enhancements to the Intra Block Copy Mode of the HEVC standard.

16 Claims, 17 Drawing Sheets

Available for IBC prediction

(56) References Cited

U.S. PATENT DOCUMENTS

2017/0195677 A1* 7/2017 Ye .................. H04N 19/159
2017/0238001 A1* 8/2017 Li .................. H04N 19/436
                                                    375/240.12

OTHER PUBLICATIONS

Joshe, et al., Screen Content Coding Test Model 3 (SCM 3), JCTVC-51014, Oct. 2014 Meeting, Strasbourg, FR.*

Pang et al.,"Intl'a block copy with larger search region", Joint Collaborative Team on Video Coding (JCT-VC) of JTU-T SG 16 WP 3 and ISO/IEC JTC 1JSC 29/\VG 11, JCTVC-Q0139, 17th Meeting: Valencia, ES, Mar. 27-Apr. 4, 2014.

* cited by examiner

ENHANCED CODING AND DECODING USING INTRA BLOCK COPY MODE

This application claims the benefit under 35 U.S.C. § 119(a)-(d) of United Kingdom Patent Application No. 1509930.2 filed on Jun. 8, 2015 and entitled "Enhanced coding and decoding using intra block copy mode." The above cited patent application is incorporated herein by reference in its entirety.

FIELD OF THE INVENTION

The present invention relates to the encoding and the decoding of video data using the Intra Block Copy Mode.

The Intra Block Copy (hereinafter IBC) mode is a prediction mode that has been added for the screen content coding of the HEVC standard.

This prediction method is particularly well suited for extremely repetitive patterns. In particular, it is known to help coding graphical elements such as glyphs (i.e., the graphical representation of a character) or traditional GUI elements, which are very difficult to code using traditional intra prediction methods.

Therefore, when encoding such data, IBC is largely selected and gives large gains for this type of content.

However, when slices or tiles are used in the images of the video data, IBC has lower gains. Consequently, the impact of slice or tile configurations is larger for screen content sequences than for other sequences.

Thus, there is a need for improvements of the IBC mode in the HEVC standard.

The present invention lies within this context.

SUMMARY OF THE INVENTION

According to a first aspect of the invention there is provided a decoding method wherein a motion vector is associated with a block of pixels of a current image,
  wherein the image is subdivided into spatial subdivisions,
  wherein the block of pixels belongs to a current spatial subdivision and is to be predicted using an Intra Block Copy mode, using a predictor block of pixels of the image designated by the motion vector, and
  wherein the predictor block designated by the motion vector may belong to any one of previously decoded spatial subdivisions in the current image.

Embodiments make it possible to extend the area for the block predictors, in particular when spatial subdivisions (e.g. slices and tiles) are used.

The coding/decoding efficiency is thereby enhanced.

Also the use of spatial subdivisions (e.g. slices and tiles) is made more flexible.

According to embodiments, the area in which the predictor block can be found is not restricted to the current spatial subdivision. It may be located in other spatial subdivisions of the current image. In particular, the area where to find the predictor block is not limited to the so-called "causal area" like in the current specification of the HEVC standard.

According to embodiments, the method comprises the following steps:
  determining a value of a local parameter associated with the current spatial subdivision,
  determining, based on the determined value, whether the predictor block is inside the current spatial subdivision or outside the current spatial subdivision.

According to embodiments, the method comprises decoding in parallel the spatial subdivisions for which the predictor block is inside the spatial subdivision.

According to embodiments, the method comprises decoding the spatial subdivisions for which the predictor block is outside the spatial subdivision after decoding the spatial subdivisions for which the predictor block is inside the spatial subdivision.

According to embodiments, the method further comprises determining a value of a global parameter associated with a sequence of spatial subdivisions, the current spatial subdivision belonging to the sequence, and the value of the local parameter is determined when the value of the global parameter is a specific value.

According to embodiments, the method comprises the following steps:
  determining a value of a global parameter associated with a sequence of spatial subdivisions, the current spatial subdivision belonging to the sequence,
  determining, based on the determined value, whether, for each block of pixels of each spatial subdivision of the sequence, the predictor block is inside the current each spatial subdivision or outside the each spatial subdivision.

According to embodiments, the method comprises the following steps:
  determining a value of a global parameter associated with a sequence of spatial subdivisions, the current spatial subdivision belonging to the sequence,
  determining, based on the determined value,
    whether, for each block of pixels of each spatial subdivision of said sequence, the predictor block is inside said current each spatial subdivision, or
    whether for each block of pixels of each spatial subdivision of said sequence, the predictor block is outside said each spatial subdivision, or
    whether it should be determined for each current spatial subdivision, based on a value of a local parameter associated with said each current spatial subdivision, whether said predictor block is inside said each current spatial subdivision or outside said each current spatial subdivision.

According to a second aspect of the invention there is provided an encoding method wherein a motion vector is associated with a block of pixels of a current image,
  wherein the image is subdivided into spatial subdivisions,
  wherein the block of pixels belongs to a current spatial subdivision and is to be predicted using an Intra Block Copy mode, using a predictor block of pixels of the image designated by the motion vector, and
  wherein the predictor block designated by the motion vector may belong to any one of previously decoded spatial subdivisions in the current image.

According to embodiments, the method further comprises the following steps:
  associating a local parameter with the current spatial subdivision,
  setting a value of the local parameter indicating whether the predictor block is inside the current spatial subdivision or outside the current spatial subdivision.

According to embodiments, the method further comprises encoding in parallel the spatial subdivisions for which the predictor block is inside the spatial subdivision.

According to embodiments, the method further comprises encoding the spatial subdivisions for which the predictor block is outside the spatial subdivision after encoding the spatial subdivisions for which the predictor block is inside the spatial subdivision.

According to embodiments, the method further comprises associating a global parameter with a sequence of spatial subdivisions, the current spatial subdivision belonging to the sequence, and setting a value of the local parameter indicating when the value of the global parameter is a specific value.

According to embodiments the local parameter is set to a value indicating that the predictor block is inside the current spatial subdivision when temporal prediction can be used for the current image.

According to embodiments, the local parameter is set to a value indicating that the predictor block is outside the current spatial subdivision when temporal prediction cannot be used for the current image.

According to embodiments, the local parameter is set to a value indicating that the predictor block is inside the current spatial subdivision when a loss ratio of a network over which the current image is to be transmitted is above a predetermined value.

According to embodiments, the local parameter is set to a value indicating that the predictor block is outside the current spatial subdivision when a loss ratio of a network over which the current image is to be transmitted is below a predetermined value.

According to embodiments, the method further comprises the following steps:
associating a global parameter with a sequence of spatial subdivisions, the current spatial subdivision belonging to the sequence,
setting a value of the global parameter indicating whether, for each block of pixels of each spatial subdivision of the sequence, the predictor block is inside the current each spatial subdivision or outside the each spatial subdivision.

According to embodiments, the method further comprises the following steps:
associating a value of a global parameter with a sequence of spatial subdivisions, the current spatial subdivision belonging to the sequence,
setting a value of the global parameter indicating,
whether for each block of pixels of each spatial subdivision of the sequence, the predictor block is inside the current each spatial subdivision, or
whether for each block of pixels of each spatial subdivision of the sequence, the predictor block is outside the each spatial subdivision, or
whether it should be determined for each current spatial subdivision, based on a value of a local parameter associated with the each current spatial subdivision, whether the predictor block is inside the each current spatial subdivision or outside the each current spatial subdivision.

According to a third aspect of the invention there is provided a system comprising:
a device comprising a processing unit configured to perform the steps of the decoding method according to the first aspect of the invention, and
a device comprising a processing unit configured to perform the steps of the encoding method according to the second aspect of the invention.

BRIEF DESCRIPTION OF THE DRAWINGS

Features and advantages of the invention will become apparent from the following description of non-limiting exemplary embodiments, with reference to the appended drawings, in which.

DETAILED DESCRIPTION OF THE INVENTION

Figure 1:
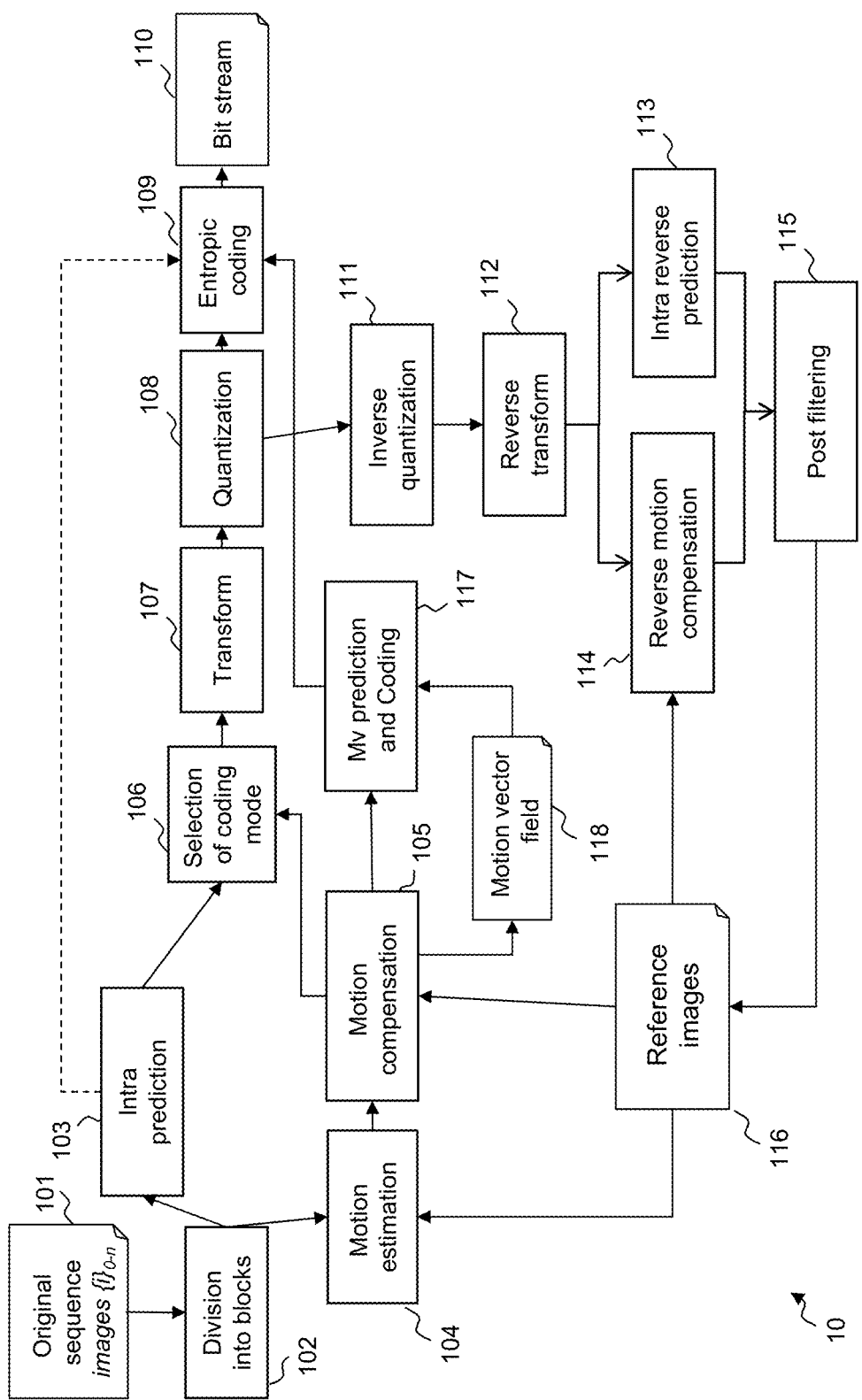
FIG. 1 illustrates an HEVC encoder architecture.

FIG. 1 illustrates the architecture of an HEVC encoder. An original sequence 101 is divided into blocks of pixels 102. A coding mode is then affected to each block.

Two families of coding modes are typically used according to the HEVC standard:
the modes based on spatial prediction or INTRA modes 103, and
the modes based on temporal prediction or INTER modes based on motion estimation 104 and motion compensation 105.

An INTRA Coding Unit is generally predicted from the encoded pixels at its "causal boundary" (defined in what follows) by a process called "INTRA prediction".

Temporal prediction first comprises finding, in a motion estimation step 104, in a previous or future frame called the "reference frame" 116, the reference area which is the closest to the Coding Unit. This reference area constitutes the predictor block.

Next, this Coding Unit is predicted using the predictor block to compute a residue in a motion compensation step 105.

In both cases (spatial and temporal prediction), a residue is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded.

Assuming that motion is homogeneous, it is particularly interesting to encode a motion vector as a difference between this motion vector and a motion vector from its surroundings.

In the H.264/AVC coding standard for instance, motion vectors are encoded with respect to a median vector computed between 3 blocks located above and on the left of the current block. Only a difference, also called "residual motion vector", computed between the median vector and the current block motion vector is encoded in the bitstream. This is processed in module "Mv prediction and coding" 117.

The value of each encoded vector is stored in the motion vector field 118. The neighboring motion vectors, used for the prediction, are extracted from the motion vector field 118.

Next, the mode for optimizing the rate distortion performance is selected in module 106.

In order to further reduce redundancies, a transform (typically a DCT), is applied to the residual block in module 107 and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames.

In order to reconstruct the coded frame, the residue is inverse quantized in module 111 and inverse transformed in module 112 in order to provide the "reconstructed" residue in the pixel domain.

According to the encoding mode (INTER or INTRA), this residue is added to the INTER predictor 114 or to the INTRA predictor 113.

Next, this first reconstruction is filtered in module 115 by one or several types of post filtering. The post filters are integrated in decoding loops. It means that they need to be applied on the reconstructed frame at the encoder and the decoder sides in order to use the same reference frame at the encoder and the decoder sides. The aim of this post filtering is to remove compression artefacts.

Decoding is described with reference to the flowchart of FIG. 2. Video stream 201 is first entropy decoded in a module 202. The residual data is then inverse quantized in a module 203 and inverse transformed in a module 204 to obtain pixel values.

Entropy decoding is also performed as a function of the mode (INTRA type decoding or an INTER type decoding).

In the INTRA mode, an INTRA predictor is determined as a function of the INTRA prediction mode specified in the bitstream 205.

In the INTER mode, the motion information is extracted from the bitstream 202. The motion information comprises the reference frame index and the motion vector residue. The motion vector predictor is added to the motion vector residue to obtain the motion vector 210. The motion vector is then used to locate the reference area in the reference frame 206. The motion vector field data 211 is updated with the decoded motion vector in order to be used for the prediction of the next decoded motion vectors.

This first reconstruction of the decoded frame is then post filtered (step 207) with exactly the same post filter as used at the encoder side. The output of the decoder is the de-compressed video 209.

According to the current HEVC standard, 3 different INTER modes are used:
the Inter mode,
the Merge mode, and
the Merge Skip mode.

The main difference between these modes is the data signaling in the bitstream.

For the Motion vector coding, the current HEVC standard includes a competitive based scheme for Motion vector prediction compared to its predecessors. Several candidates compete with the rate distortion criterion at the encoder side in order to find the best motion vector predictor or the best motion information for, respectively, the Inter or the Merge mode. An index corresponding to the best predictors or the best candidate of the motion information is inserted in the bitstream. The decoder can derive the same set of predictors or candidates and uses the best one according to the decoded index.

According to the Screen Content Extension of the HEVC standard, Intra Block Copy mode is signaled as any one of the three INTER modes. The difference between IBC and the equivalent INTER mode is made by checking whether the reference frame is the current one. This can be implemented, e.g., by checking the reference index of the list of reference frames (called "L0" in the HEVC standard) and determining that Intra Block Copy mode is used in case it is the last frame in the list. Another way to do is to compare the Picture Order Count of current and reference frames. In case they are equal, it is determined that Intra Block Copy mode is used.

The determination of the predictors and the candidates is important in the process of obtaining the best coding efficiency possible with the smallest impact possible on complexity.

According to HEVC, two motion vector derivations are used:
one for the Inter mode (Advanced Motion Vector Prediction (AMVP)), and
one for the Merge modes (Merge derivation process).

These processes are described in what follows.

Figure 3:
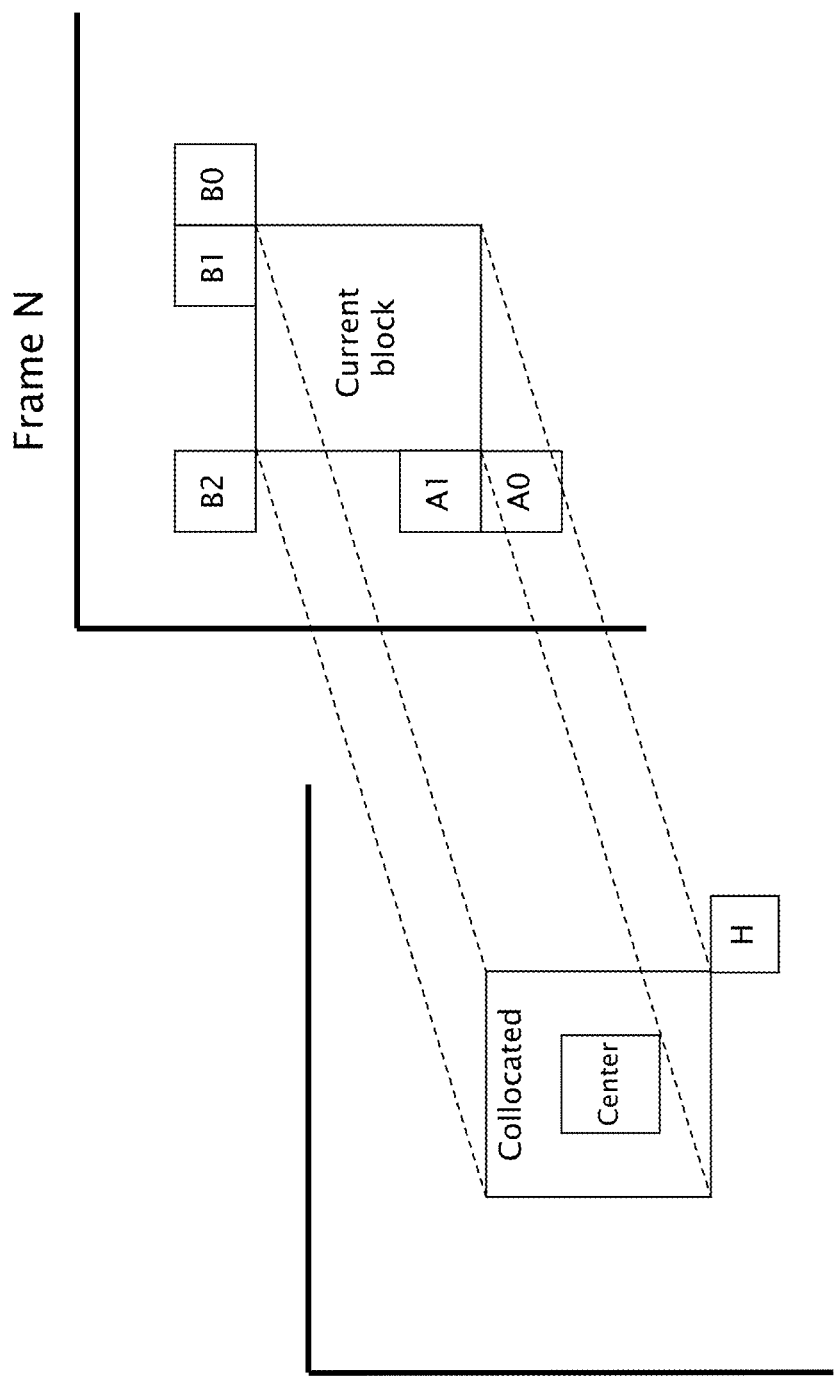
FIG. 3 illustrates neighboring positions blocks used to generate motion vector predictors in AMVP and Merge of HEVC.

FIG. 3 schematically illustrates spatial and temporal blocks that can be used for generating motion vector predictors in Advanced Motion Vector Prediction (AMVP) and Merge modes of the HEVC coding and decoding systems.

Two predictors, i.e., the two spatial motion vectors of the AMVP mode, are chosen among the top blocks and the left blocks including the top corner blocks and left corner block and one predictor is chosen among the bottom right block and center block of the collocated block as represented in FIG. 3.

Figure 4:
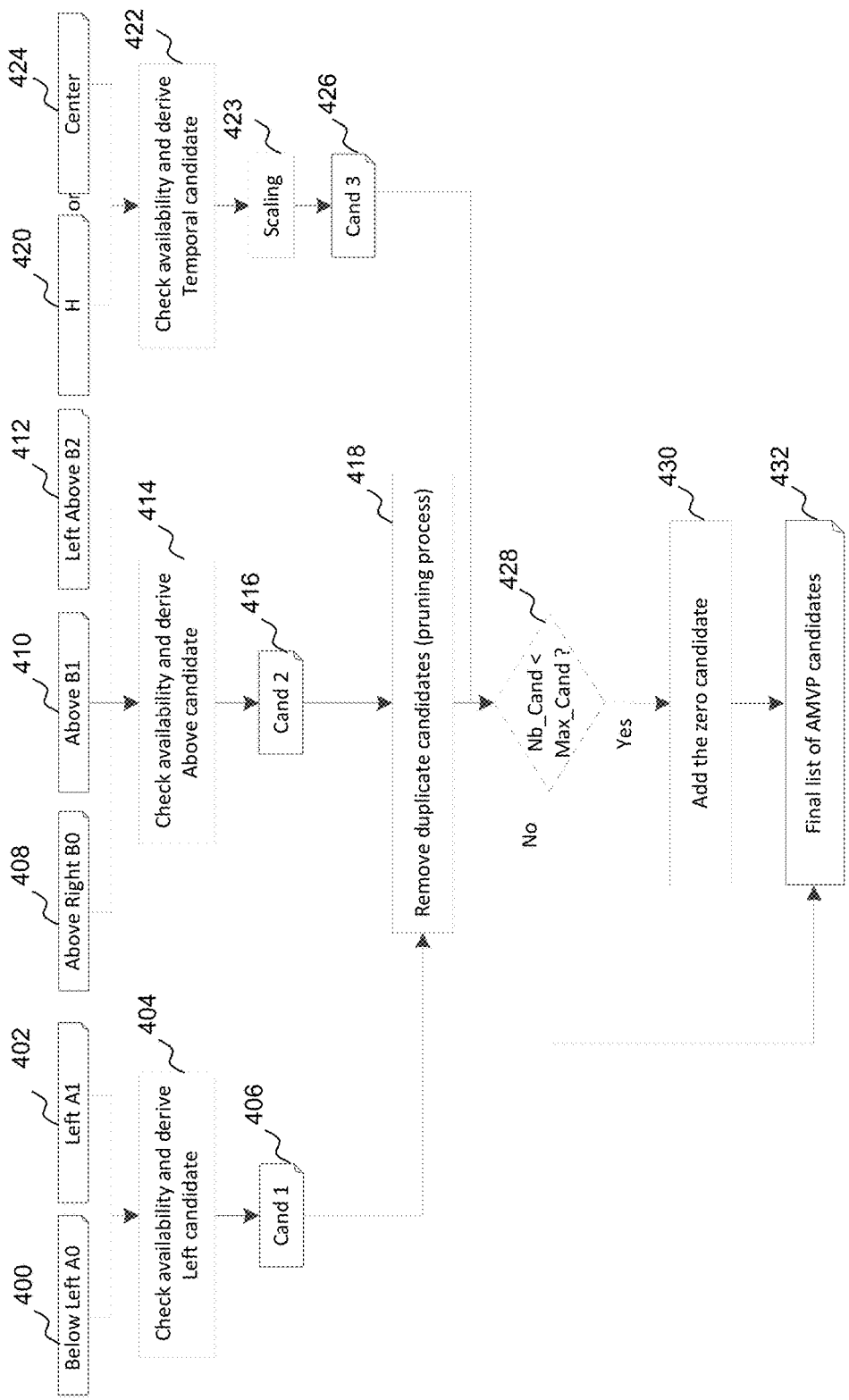
FIG. 4 illustrates a derivation process of motion vector predictors in AMVP.

FIG. 4 is a flowchart of steps of the process of the AMVP predictor set derivation.

A first step 406 aims at selecting a first spatial predictor ("Cand 1") among the bottom left blocks A0 and A1 illustrated in FIG. 3.

These blocks are selected (400, 402) one after another, in the given order, and, for each selected block, the following conditions are evaluated (step 404) in the given order, the first block for which conditions are fulfilled being set as a predictor:
the motion vector from the same reference list and the same reference image;
the motion vector from the other reference list and the same reference image;
the scaled motion vector from the same reference list and a different reference image; or
the scaled motion vector from the other reference list and a different reference image.

If no value is found, the left predictor is considered as being unavailable. In such a case, the related blocks were INTRA coded or those blocks do not exist.

A following step 416 aims at selecting a second spatial predictor ("Cand 2") among the top right block B0, the top block B1, and the left top block B2 illustrated in FIG. 3.

These blocks are selected (steps 408, 410, 412) one after another, in the given order, and, for each selected block, the conditions described hereinabove are evaluated (step 414) in the given order, the first block for which the above mentioned conditions are fulfilled being set as a predictor.

Again, if no value is found, the top predictor is considered as being unavailable. In such a case, the related blocks were INTRA coded or those blocks do not exist.

In a next step 418 the two predictors, if both are available, are compared one to the other to remove one of them if they are equal (i.e. same motion vector values, same reference list, same reference index and the same direction type). If only one spatial predictor is available, a temporal predictor is determined in a following step.

The temporal motion predictor ("Cand 3") determined in step 426 is derived as follows. The bottom right (H) position of the collocated block in a previous frame is determined (step 420) and is first considered in the availability check module 422. If it does not exist or if the motion vector predictor is not available, the center of the collocated block ("Centre") determined in step 424 is selected to be checked. These temporal positions (Centre and H) are illustrated in FIG. 3.

In any cases, scaling 423 is applied on the candidates to have them match with the temporal distance between the current frame and the first frame in the reference list.

The motion predictor value is then added to the set of predictors. Next, the number of predictors (Nb_Cand) is compared (step 428) to the maximum number of predictors (Max_Cand). As mentioned above, the maximum number of predictors (Max_Cam) of motion vector predictors that the derivation process of AMVP needs to generate is two in the current version of HEVC standard.

If this maximum number is reached, the final list or set of AMVP predictors 432 is built. Otherwise, a zero predictor is added (step 430) to the list. The zero predictor is a motion vector equal to (0, 0).

The final list or set of AMVP predictors 432 is built from a subset of spatial motion predictors 400 to 412 and from a subset of temporal motion predictors 420, 424.

A motion predictor candidate of the Merge mode or the Merge Skip mode represents all the required motion information: direction, list, reference frame index, and motion vectors. An indexed list of several candidates is generated by the Merge derivation process.

According to the current HEVC standard, the maximum number of candidates for both Merge modes is equal to five (four spatial candidates and one temporal candidate).

Figure 5:
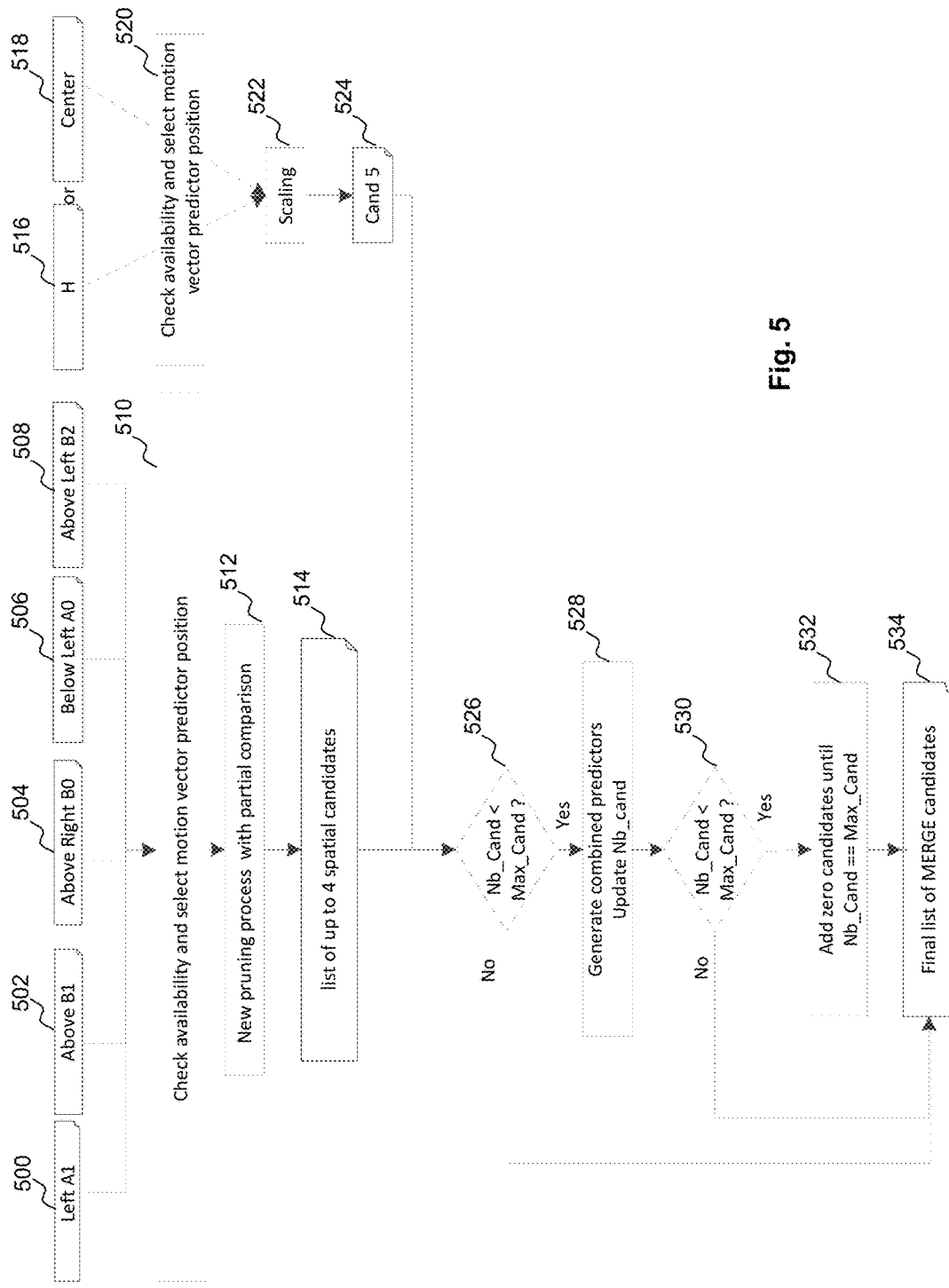
FIG. 5 illustrates a derivation process of motion candidates in Merge.

FIG. 5 is a schematic illustration of a motion vector derivation process of the Merge modes.

In a first step of the derivation process, five block positions are considered (500 to 508). These positions are the spatial positions depicted in FIG. 3 with references A1, B1, B0, A0, and B2. In a following step, the availability of the spatial motion vectors is checked and at most five motion vectors are selected (510). A predictor is considered as available if it exists and if the block is not INTRA coded. Therefore, selecting the motion vectors corresponding to the five blocks as candidates is done according to the following conditions:

if the "left" A1 motion vector (500) is available (510), i.e. if it exists and if this block is not INTRA coded, the motion vector of the "left" block is selected and used as a first candidate in list of candidate (514);

if the "above" B1 motion vector (502) is available (510), the candidate "above" block motion vector is compared to "left" A1 motion vector (512), if it exists. If B1 motion vector is equal to A1 motion vector, B1 is not added to the list of spatial candidates (514). On the contrary, if B1 motion vector is not equal to A1 motion vector, B1 is added to the list of spatial candidates (514);

if the "above right" B0 motion vector (504) is available (510), the motion vector of the "above right" is compared to B1 motion vector (512). If B0 motion vector is equal to B1 motion vector, B0 motion vector is not added to the list of spatial candidates (514). On the contrary, if B0 motion vector is not equal to B1 motion vector, B0 motion vector is added to the list of spatial candidates (514);

if the "below left" A0 motion vector (506) is available (510), the motion vector of the "below left" is compared to A1 motion vector (512). If A0 motion vector is equal to A1 motion vector, A0 motion vector is not added to the list of spatial candidates (514). On the contrary, if A0 motion vector is not equal to A1 motion vector, A0 motion vector is added to the list of spatial candidates (514); and if the list of spatial candidates does not contain four candidates, the availability of "above left" B2 motion vector (508) is checked (510). If it is available, it is compared to A1 motion vector and to B1 motion vector. If B2 motion vector is equal to A1 motion vector or to B1 motion vector, B2 motion vector is not added to the list of spatial candidates (514). On the contrary, if B2 motion vector is not equal to A1 motion vector or to B1 motion vector, B2 motion vector is added to the list of spatial candidates (514).

At the end of this stage, the list of spatial candidates comprises up to four candidates.

For the temporal candidate, two positions can be used: the bottom right position of the collocated block (516, denoted H in FIG. 3) and the center of the collocated block (518). These positions are depicted in FIG. 3.

As for the AMVP motion vector derivation process, a first step aims at checking (520) the availability of the block at the H position. Next, if it is not available, the availability of the block at the center position is checked (520). If at least one motion vector of these positions is available, the temporal motion vector can be scaled (522), if needed, to the reference frame having index 0, for the lists of reference frames (both lists called "L0" and "L1" in the HEVC standard), in order to create a temporal candidate (524) which is added to the list of Merge motion vector predictor candidates. It is positioned after the spatial candidates in the list. The lists L0 and L1 are 2 reference frame lists containing zero, one or more reference frames.

If the number (Nb_Cand) of candidates is strictly less (test 526) than the maximum number of candidates (Max_Cand, this value is signaled in the bit-stream slice header and is equal to five in the current HEVC design) and if the current frame is of the B type, combined candidates are generated (528). Combined candidates are generated based on available candidates of the list of Merge motion vector predictor candidates. It mainly consists in combining the motion vector of one candidate of the list L0 with the motion vector of one candidate of list L1.

If the number (Nb_Cand) of candidates remains strictly less (test 530) than the maximum number of candidates (Max_Cand), zero motion candidates are generated (532) until the number of candidates of the list of Merge motion vector predictor candidates reaches the maximum number of candidates.

At the end of this process, the list or set of Merge motion vector predictor candidates is built (534). As illustrated in FIG. 5, the list or set of Merge motion vector predictor candidates is built (534) from a subset of spatial candidates (500 to 508) and from a subset of temporal candidates (516, 518).

The coding structure used in the HEVC standard is described with reference to FIG. 6.

According to the HEVC standard, the original video sequence 601 is considered as a succession of digital images "images i". A digital image is represented by one or more matrices in which the coefficients represent pixels.

Each image 602 is divided into slices 603. A slice is a part of the image or the entire image. According to the HEVC standard, these slices are divided into non-overlapping Coding Tree Blocks (CTB) 604, generally blocks of size 64 pixels×64 pixels. Each CTB may in its turn be iteratively divided into smaller variable size Coding Units (CUs) 605 using a quadtree decomposition.

Coding units are the elementary coding elements and are constituted of two sub-units which are the Prediction Units (PU) and the Transform Units (TU) of maximum size equal to the CU's size.

The Prediction Units correspond to the partition of the CU for prediction of pixels values. Each CU can be further partitioned into a maximum of 4 square Partition Units or 2 rectangular Partition Units 606. Transform units are used to represent the elementary units that are spatially transform with DCT. A CU can be partitioned in TU based on a quadtree representation 607.

Each slice is embedded in one NAL unit. In addition, the coding parameters of the video sequence are stored in dedicated NAL units called parameter sets. According to the HEVC and H.264/AVC standards, two kinds of parameter sets NAL units are employed:
- the Sequence Parameter Set (SPS) NAL unit that gathers all parameters that are unchanged during the whole video sequence. Typically, it handles the coding profile, the size of the video frames and other parameters, and
- the Picture Parameter Sets (PPS) that codes the different values that may change from one frame to another.

The HEVC standard also defines a Video Parameter Set (VPS) which contains parameters describing the overall structure of the stream.

Figure 7:
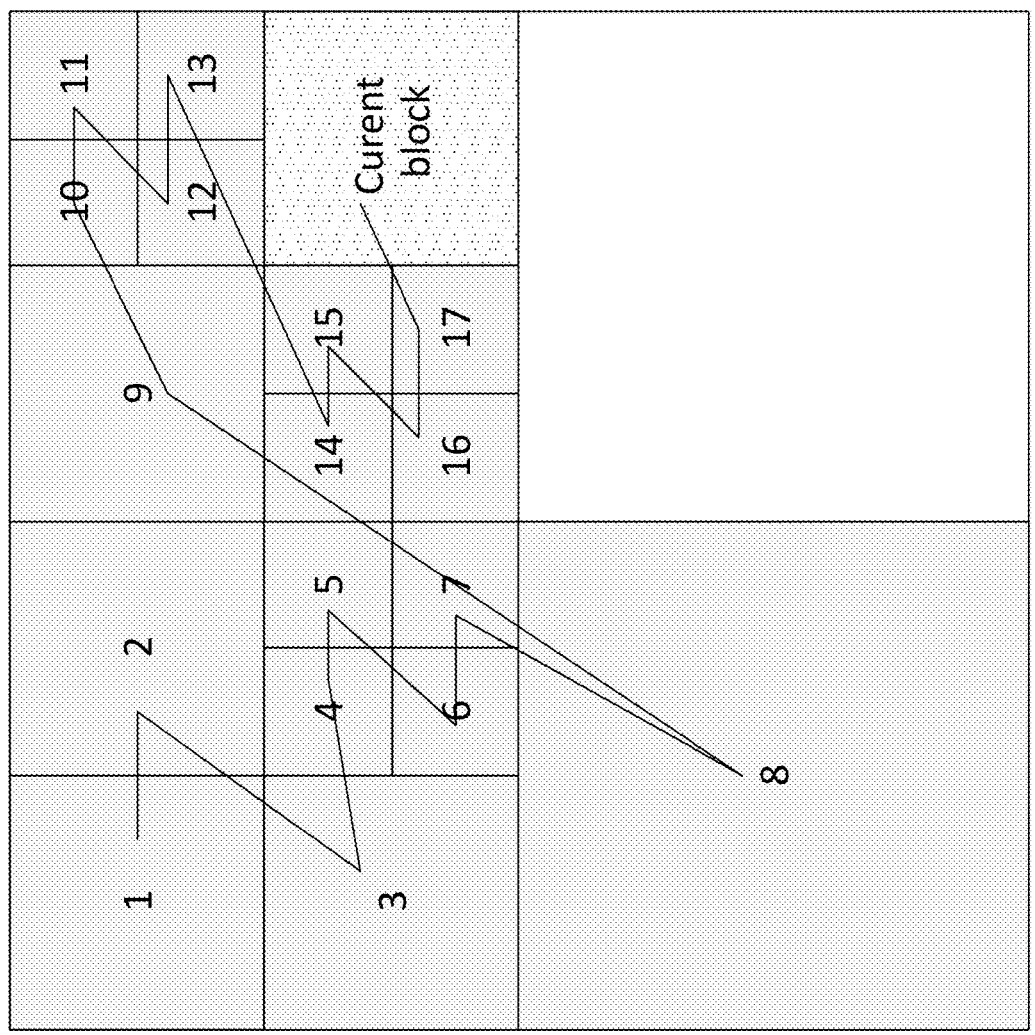
FIG. 7 illustrates the Coding Tree Block splitting in Coding Units and the scan order decoding of these Coding Unit.

FIG. 7 illustrates the Coding Tree Block splitting in Coding Units and the scan order decoding of these Coding Units.

According to the HEVC standard, the block structure is organized by Coding Tree Blocks (CTB). A frame contains several non-overlapped and square Coding Tree Blocks. The size of a Coding Tree Block can be equal to 64×64 to 16×16. This size is determined at sequence level.

The most efficient size, in terms of coding efficiency, is the largest one: 64×64. All Coding Tree Blocks have the same size except for the image border. In that case, the size is adapted according to the amount of pixels.

Each Coding Tree Block contains one or more square Coding Units (CU). The Coding Tree Block is split based on a quad-tree structure into several Coding Units. The coding or decoding order of each Coding Unit in the Coding Tree Block follows the quad-tree structure based on a raster scan order. An example of the decoding order of Coding Units is illustrated in FIG. 7. In this figure, the number in each Coding Unit gives the decoding order of each Coding Unit of this Coding Tree Block.

The Intra Block Copy (IBC) was added as an additional mode for Screen content coding extension of HEVC. This prediction method is particularly well suited for extremely repetitive patterns. In particular, it is known to help coding graphical elements such as glyphs (i.e., the graphical representation of a character) or traditional GUI elements, which are very difficult to code using traditional intra prediction methods.

Figure 8:
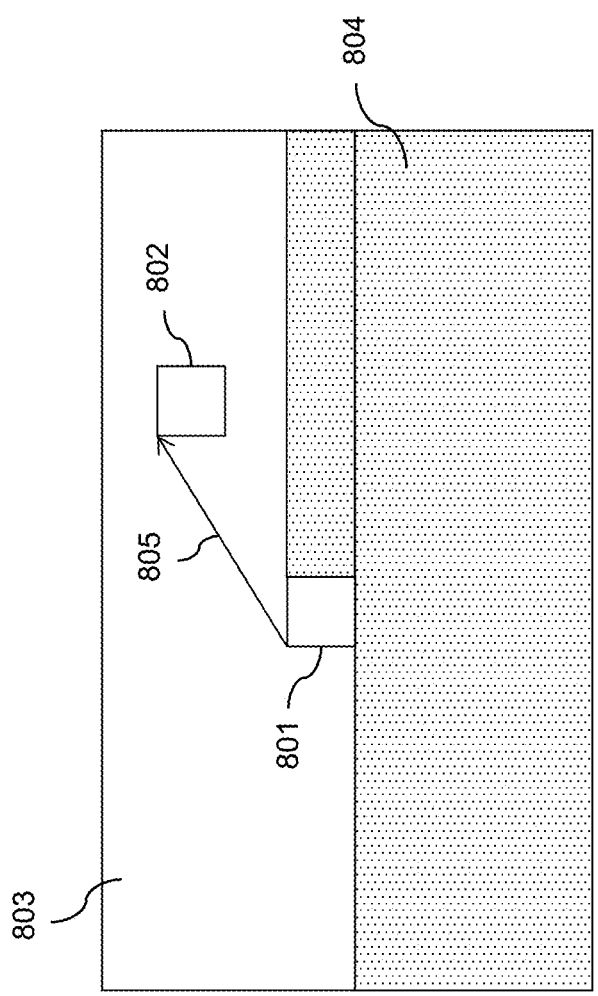
FIG. 8 illustrates the concept of the causal area.

With reference to FIG. 8, it is described how this Intra Block Copy prediction mode may be implemented.

Figure 2:
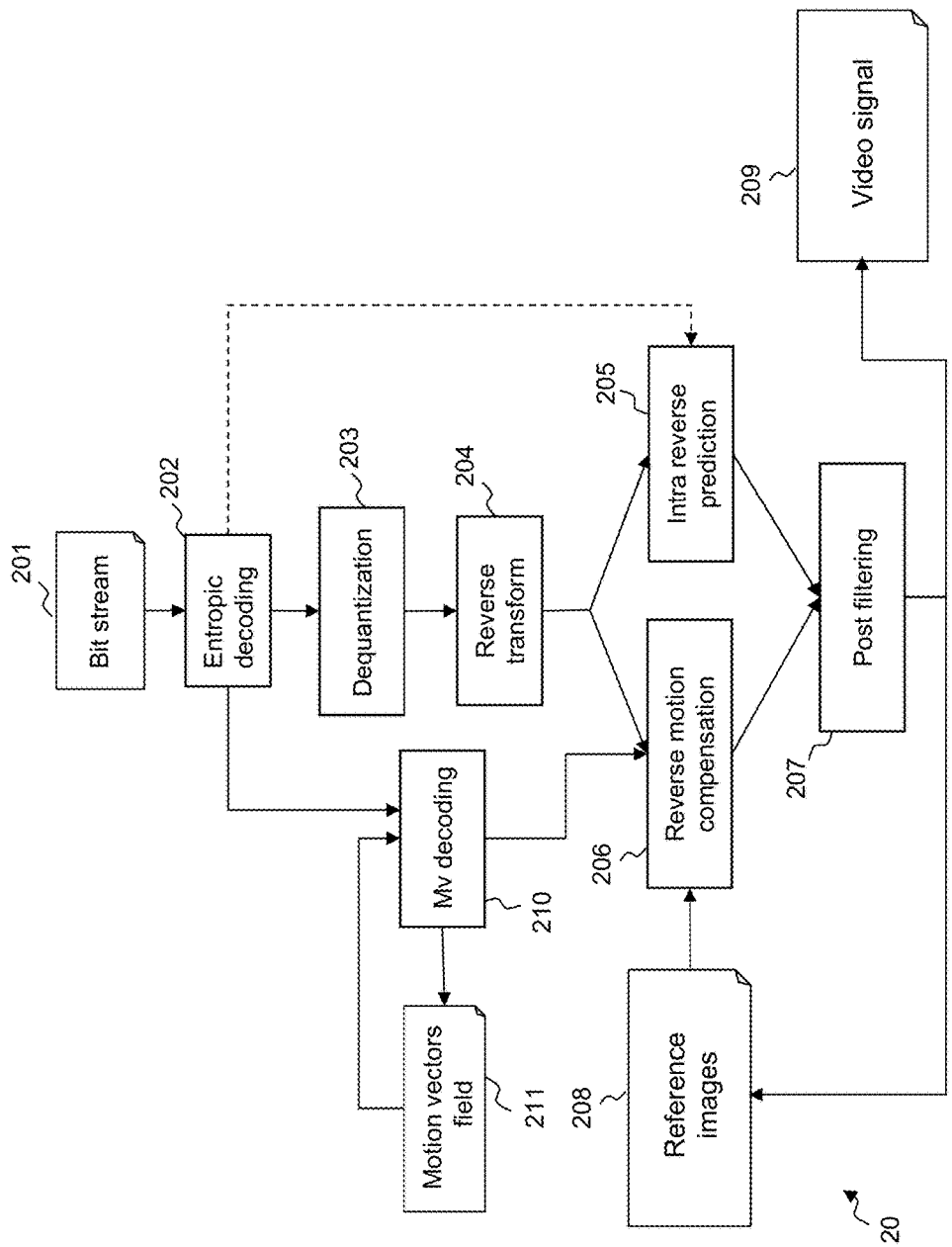
FIG. 2 illustrates an HEVC decoder architecture.

For example, this IBC prediction mode is substituted to the whole INTRA prediction mode in the encoder or decoder illustrated in FIG. 1 or FIG. 2.

At a high-level, an image is divided into Coding Units that are encoded in raster scan order. Thus, when coding block 801, all the blocks of area 803 have already been encoded and can be considered available to the encoder. Area 803 is called the causal area of the Coding Unit 801. Once Coding Unit 801 is encoded, it will belong to the causal area for the next Coding Unit. This next Coding Unit, as well as all the next ones, belongs to area 804 (dotted area), and cannot be used for coding the current Coding Unit 801. The causal area is constituted by reconstructed blocks. The information used to encode a given Coding Unit is not the original blocks of the image (this information is not available during decoding). The only information available at decoding is the reconstructed version of the blocks of pixels in the causal area, namely the decoded version of these blocks. For this reason, at encoding, previously encoded blocks of the causal area are decoded to provide this reconstructed version of these blocks.

Intra Block Copy works by signaling a block 802 in the causal area which should be used to produce a prediction of block 801. For example, the block 802 may be found by using a matching algorithm. In the HEVC Screen content Extension, this block is indicated by a block vector 805, and is transmitted in the bitstream.

This block vector is the difference in coordinates between a particular point of the Coding Unit 801 and the equivalent point in the predictor block 802. The motion vector difference coding consists, for a value d, in coding whether d is zero, and if not, its sign and its magnitude minus 1. In HEVC motion vector difference coding interleaves the x and y components of the vector.

Figure 6:
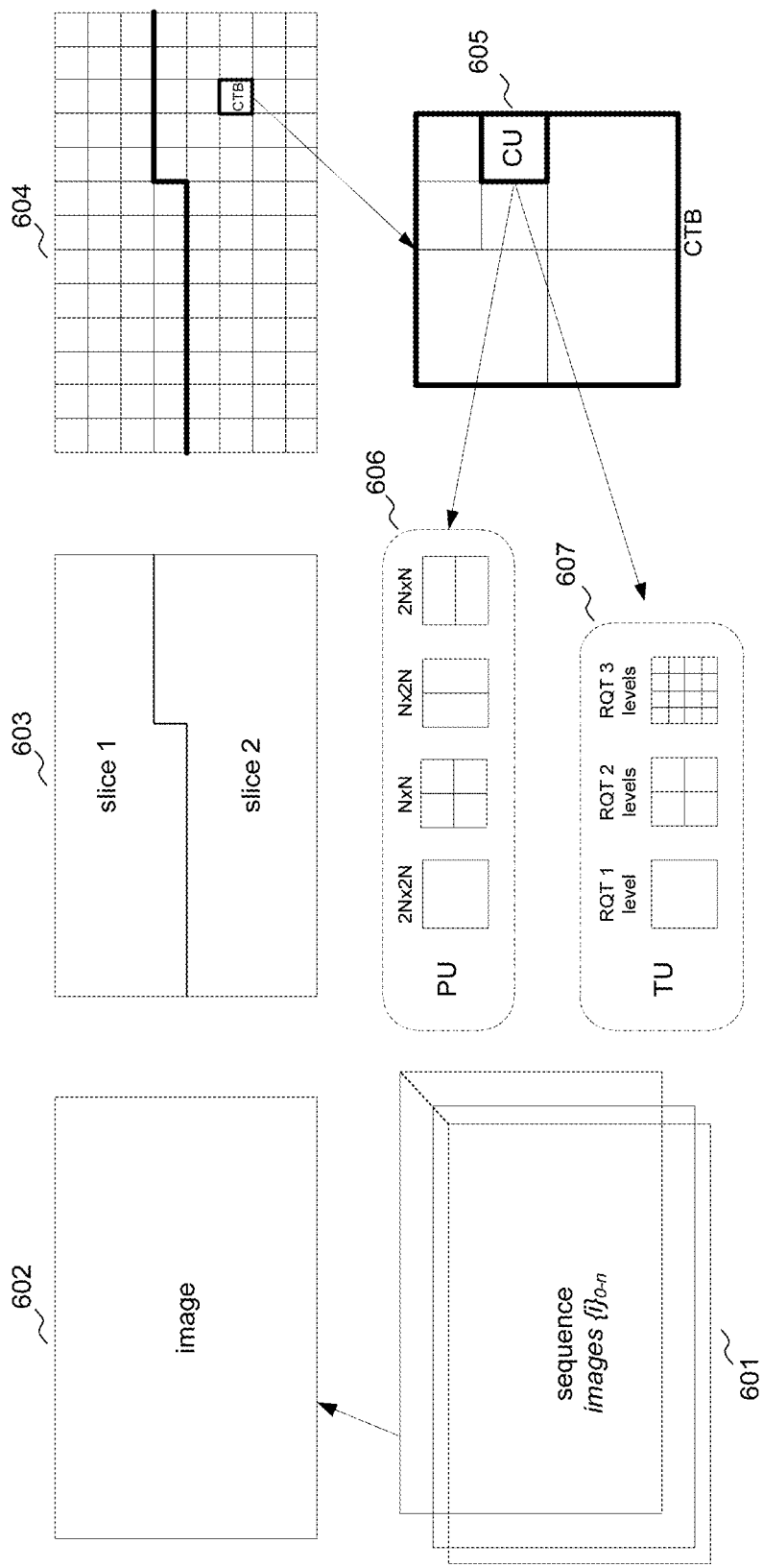
FIG. 6 illustrates the Level decomposition of Video frame.

According to the current version of HEVC, as IBC is signaled as an Inter mode, each IBC CU can be split into one or 2 PUs as depicted in FIG. 6. For the smallest CU size, 8×8, and for INTRA coding modes, the CU can be also split into 4 PUs of 4×4 pixels each. For INTER modes, the N×N partition is not available. It means that the 4×4 block size cannot be used for them. The palette mode does not have the concept of PU as it applies to a whole CU.

Three types of Intra Block Copy block vector estimation are available in the current reference software of the HEVC SCC extension.

The first one is the classical IBC search and it corresponds to a dedicated block matching algorithm.

The second one is based on the Hash search algorithm.

Finally, the third one is a cache-based search, where previously interesting positions are evaluated.

Figure 9:
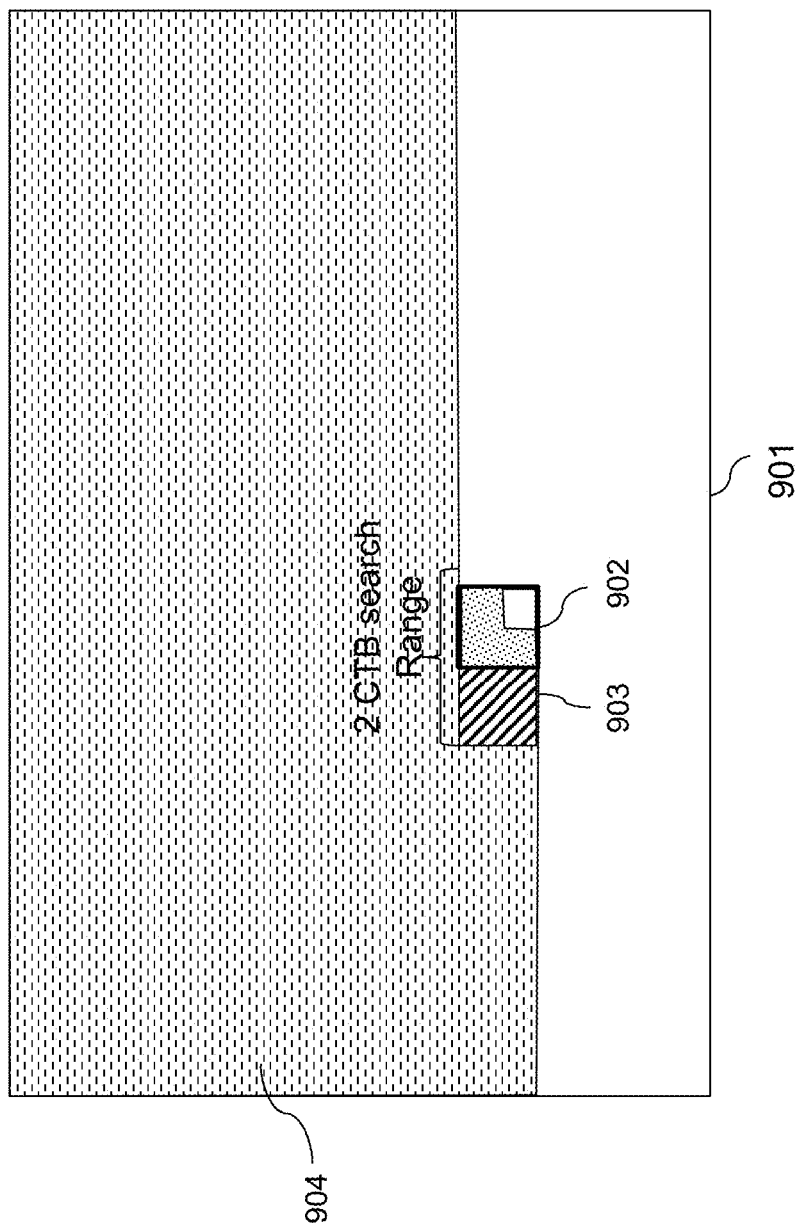
FIG. 9 illustrates the Intra Block Copy search area.

Two search ranges are also defined. As depicted in FIG. 9, for a frame 901, the two CTBs search range corresponds to the left CTB 903 and to the blocks of the current CTB 902 already encoded. The blocks of current CTB already encoded are depicted in dotted area in FIG. 9. The full frame search corresponds to all the CTBs already encoded 904.

In the Intra Block Copy mode, the "block" vector is the difference in coordinates between a particular point in a block A to encode and the equivalent point in the predictor block D of FIG. 8.

Figure 10:
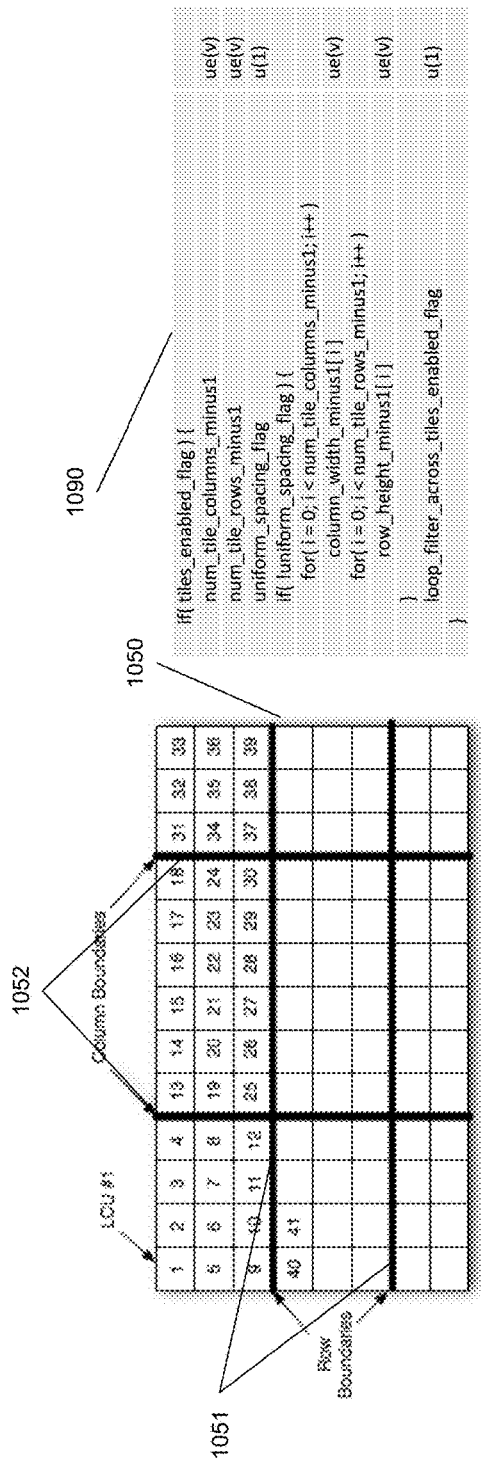
FIG. 10 illustrates the concept of slices tiles of HEVC.
Figure 10:
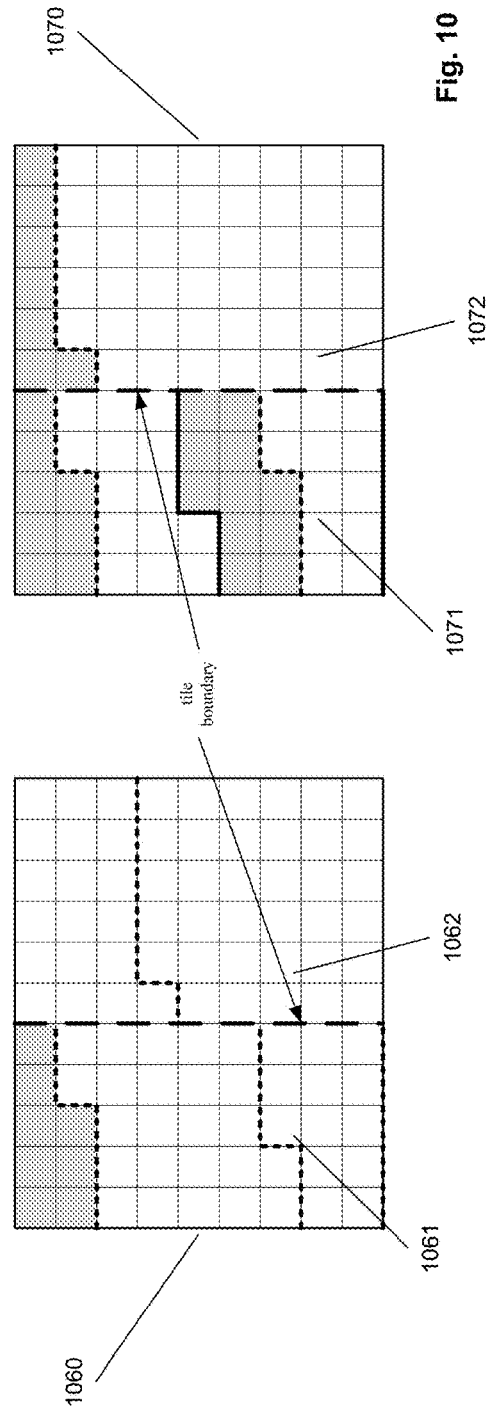

With reference to FIG. 10, the specific tiles and slices organization in the HEVC format are described.

The HEVC standard defines different spatial subdivision of pictures: tiles, slices and slice segments. These different partitions have been introduced for different purposes: the slices are related to streaming issues while the tiles and the slice segments have been defined for parallel processing.

A tile defines a rectangular region of a picture that contains an integer number of Coding Tree Units (CTU). The tiling is only defined by row and column boundaries (1051, 1052) as depicted in FIG. 10. This makes the tiles good candidates for regions of interest description in terms of position and sizes.

However, the HEVC bitstream organization in terms of syntax and its encapsulation into Network Abstract Layer (NAL) units is rather based on slices (as in AVC). A slice in HEVC is a set of slice segments, with at least the first slice segment being an independent slice segment, the others, if any, being dependent slice segments.

A slice segment contains an integer number of consecutive (in raster scan order) CTUs. It has not necessarily a rectangular shape (thus less appropriate than tiles for ROI representation).

A slice segment is encoded in the HEVC bitstream as a "slice_segment_header" followed by "slice_segment_data".

Independent slice segments and dependent slice segments differ by their header: the dependent slice segment has a shorter header because reusing information from the independent slice segment's header.

Both independent and dependent slice segments contain a list of entry points in the bitstream: either to tiles or to entropy decoding synchronization points.

To better understand the relationships between slice, slice segments and tiles, different configurations 1060 and 1070 are illustrated in FIG. 10.

These configurations differ from configuration 1050 in the same figure. The configuration 1050 corresponds to a case where 1 tile has 1 slice (containing only 1 independent slice segment).

In configuration 1060, the picture is partitioned in 2 vertical tiles (1061, 1062) and 1 slice (with 5 slice segments). On the right part of the figure, the picture 1070 is split into 2 tiles (1071, 1072), the left tile 1071 having 2 slices (each with 2 slice segments) and the right tile 1072 having 1 slice (with 2 slice segments).

The HEVC standard defines organization rules between tiles and slice segments that can be summarized as follows (one or both conditions have to be met):

all CTUs in a slice segment belong to the same tile, and/or all CTUs in a tile belong to the same slice segment.

Figure 11:
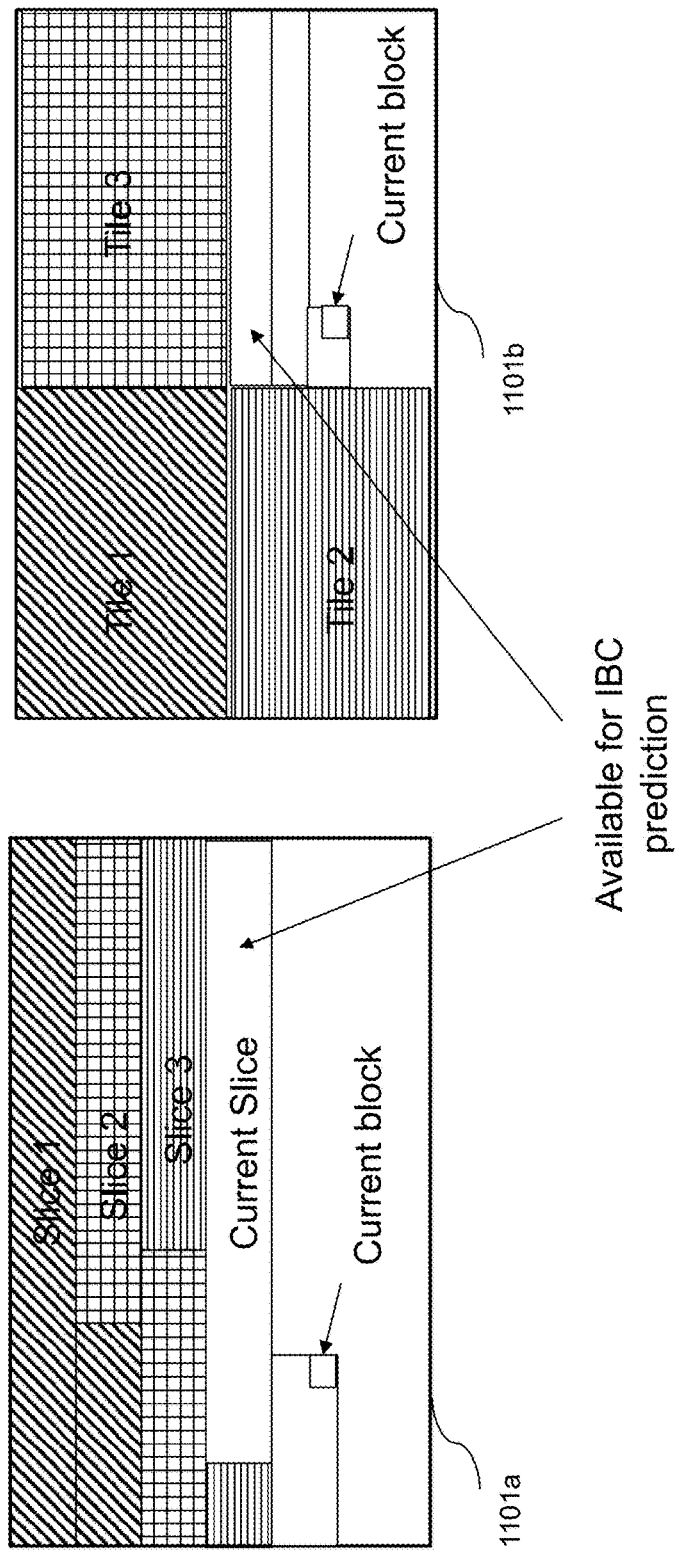
FIG. 11 illustrates the available search area of IBC.

Historically, the Intra block copy tool was first defined as an Intra mode. Therefore, like other Intra modes, the pixel prediction depends only on the pixels of the current slice or tile, as depicted in FIG. 11.

According to this independence between prediction and between syntax, a slice or a tile of the current frame can be decoded independently from the decoding of the other slices or tiles of the current frame. This makes it possible to decode each slice or tile of the current frame in parallel because the decoding process does not need a syntax value or a pixel value from other slices or tiles of the current frame. Moreover, when only one tile or slice is lost the other available slice or tile can be fully decoded (if there is no loss in the previous decoded frame).

Yet, there are other interesting properties for video transmission or parallelization of the decoding. For example, the independence of parsing is also interesting. The parsing is the process which consists in reading the syntax only. Then these data are used to decode the pixel. The independence of parsing of a slice means that a decoder can decode the syntax but the pixel predictors are dependent to the other slices.

The frame 1101*a* illustrates a split of a frame in several slices and 1101*b* illustrates a split of a frame into 4 tiles. As depicted, the available area for IBC is the causal area of the current slice (1101*a*) or the causal area of the current tile (1101*b*).

When slices or tiles are used, the coding efficiency is of course reduced. For screen content sequences where IBC is very efficient, the losses are even larger.

In the current version of the HEVC standard, the IBC is signaled as a reference frame in the reference frame list. This means that the current decoded causal blocks is set in a reference frame and are available for inter prediction.

In the current HEVC screen content reference specification text, SCM4.0, the IBC mode cannot point to a block outside a current slice. However, IBC is signaled as an Inter reference frame. Therefore, it is considered that IBC could access all slices of the current frame.

In what follows, according to embodiments, the search area of IBC when several slices are present in the current frame may be transmitted in order to offer several compromises between coding efficiency and robustness. Embodiments may be implemented for the IBC mode or for any other prediction mode wherein the reference image is the current image.

In the following description, the terms IBC prediction or Inter prediction from the current frame refer to the same concept.

Figure 12:
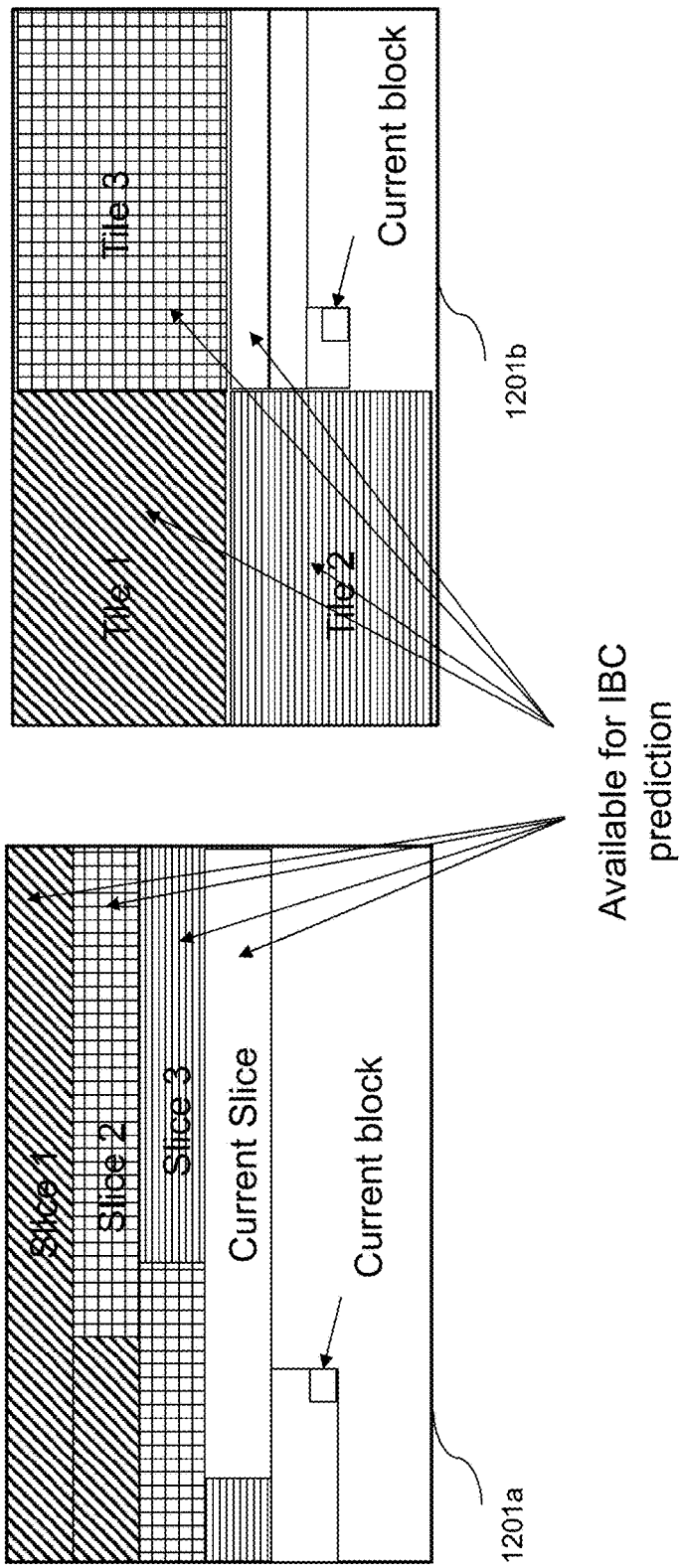
FIGS. 12-16 illustrates embodiments of the invention.

According to embodiments, it is allowed to use all the causal area of the current frame for the IBC prediction. Such embodiments are illustrated in FIG. 12. For a slice configuration (1201*a*), it means that all previous slices (slice 1, slice 2, slice 3) are available at the encoder side in addition to the causal area of the current slice and potentially an IBC block predictor can come from these previous slices at decoder side.

In the same way, FIG. 12 illustrates this solution for a tile configuration (1201*b*). It means that all previous tiles (Tile 1, Tile 2, and Tile 3) are available for IBC prediction at encoder side in addition to the causal area of the current Tile and potentially at decoder side, an IBC block predictor can belong to these previous tiles.

Thus, the encoder implementations are made simpler. According to the current HEVC standard text, a reference frame is considered to be entirely available. There is no consideration of the slice or tile splitting of the previous encoded/decoded frame.

Therefore, for an easy implementation of the current frame as a reference frame with a slice or tile configuration, it may be desirable to have the same consideration for the current frame as the reference frame.

In the following description, it is considered that the encoder/decoder can switch between a mode wherein all encoded/decoded blocks of the current frame are available and a mode wherein the availability of all encoded/decoded blocks of the current slice (or tile) is restricted.

The switching between the two modes can be at sequence, frame, slice or tile level.

The case for slices is first described. Then the case for tiles is considered.

For example, a parameter denoted "previous_slices_availability_control" is transmitted in an SPS (sequence parameter set) to specify the availability of decoded blocks. When it is set equal to '0', only the decoded blocks of the current slice can be used for the Inter prediction from the current frame for all slices in the sequence. When it is equal to '1', all previous decoded slices and the current one are available for the Inter prediction from the current frame.

When it is equal to '2', another flag is transmitted for each frame or slice to indicate the method used. In this case, it may be switched between both availabilities at each frame or slice.

If the "previous_slices_availability_control" parameter is set equal to '2', a flag denoted "previous_slices_available_for_current_ref_frame" is transmitted for each slice. If it is equal to '0', only blocks of the current slice are available for the IBC prediction. If it is set equal to '1', all the causal area of the current frame is available for the Inter prediction from the current frame of the current slice.

The use of the full causal area of the current frame for the inter prediction from the current frame implies a reduction of robustness for slice configuration. Indeed, the slices of the current frame are not fully independent. Only their parsing are independent. When the flag "previous_slices_available_for_current_ref_frame" is transmitted at slice level, it is possible to find alternative compromises between coding efficiency and robustness.

Figure 13:
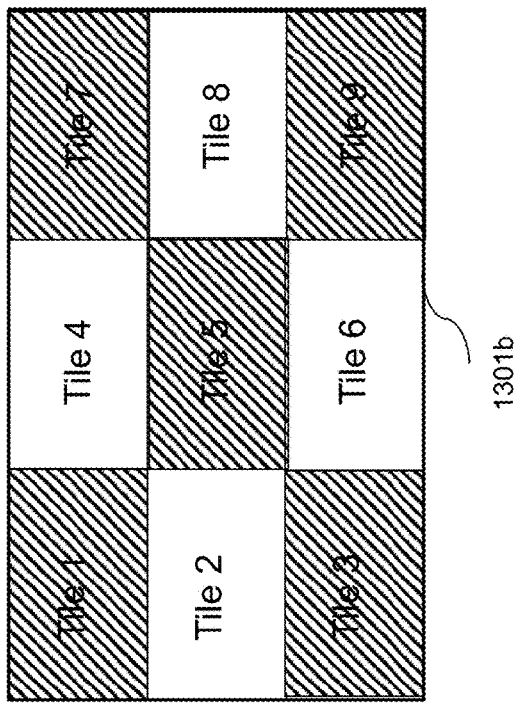
Figure 13:
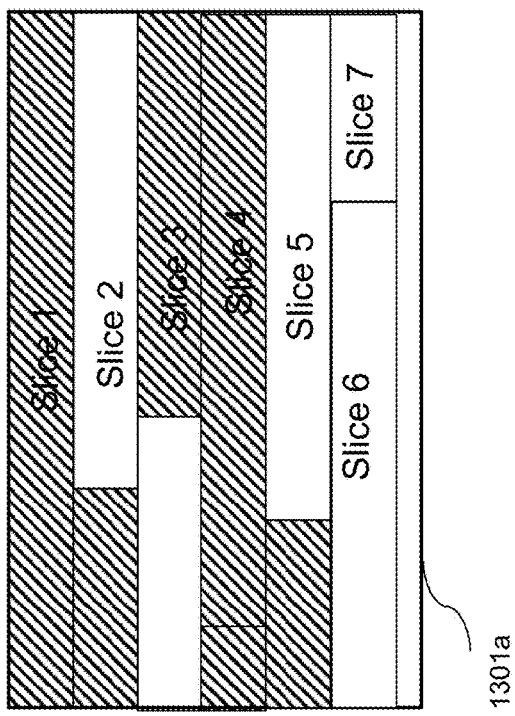

FIG. 13 (1301a) illustrates this embodiment for a slice configuration. In the figure, the dashed slices have their flags "previous_slices_available_for_current_ref_frame" equal to '1' and the white slices have their flags equal to '0'. In this case, the white slices can be decoded independently. So these slices can be decoded in parallel. The dashed slices need to be decoded after the decoding of the causal white slices.

Another possible selection of the values of theses flags is as follows. The flag "previous_slices_available_for_current_ref_frame" is set to '1' for all slices of the first frame of the GOP in order to significantly reduce the rate of the frame which can't use the temporal prediction. The flag is set it to '0' for the frames which can use the temporal prediction which have generally a lower rate.

According to embodiments, the encoder may also take into account a network loss ratio to set the value of flag "previous_slices_available_for_current_ref_frame". The loss ratio is a value which depends on the number of network packet losses. For example, when the ratio is high flag "previous_slices_available_for_current_ref_frame" is set equal to '0' and to '1' when the ratio is low. The threshold to determine if the loss ratio is high or low may depend on the amount of slices or tiles in a frame, the size of the image, the number of "intra" refresh frame in the sequence, or the distance to this intra frame.

When considering tiles, similar embodiments as those for slices may be implemented.

A parameter denoted "previous_tiles_availability_control" is transmitted in the SPS (sequence parameter set) to specify the availability of decoded blocks. When it is set equal to '0', for all tiles in the sequence, only the decoded blocks of the current tile are available for the Inter prediction from the current frame. When it is equal to '1', all previous decoded tiles of the current frame and the current one are available for the Inter prediction from the current frame. When it is equal to '2', another flag is transmitted for each frame or tile to indicate which method is used. In this case, it may be switched between both availabilities for each frame or tile level.

If the "previous_tiles_availability_control" parameter is set equal to '2', a flag denoted "previous_tiles_available_for_current_ref_frame" is transmitted for each tile. If it is equal to '0', only blocks of the current tile are available for the IBC prediction. If it is set equal to '1', all the causal area of the current frame is available for the inter prediction from the current frame of the current tile.

The use of the full causal area of the current frame for the inter prediction from the current frame implies reduction of robustness for tile configuration. Indeed, the tiles of the current frame are not fully independent, only their parsing are independent. When the flag "previous_tiles_available_for_current_ref_frame" is transmitted at tile level, it is possible to find alternative compromises between coding efficiency and robustness.

FIG. 13 (1301b) illustrates this embodiment for a tile configuration. In this figure, the dashed tiles have their flags "previous_tiles_available_for_current_ref_frame" equal to '1' and the white tiles have their flags equal to '0'. In this case, the white tiles can be decoded independently. So these slices can be decoded in parallel. The dashed slices need to be decoded after the decoding of the causal area.

In the HEVC standard, each picture can be divided into tile columns, each picture can be divided into tile rows, each tile column can be divided into tiles and each tile row can be divided into tiles. According to embodiments, a flag can be transmitted for tile rows or tile columns with the similar functioning as for the "previous_tiles_availability_control" parameter.

According to the HEVC standard, a tile can be divided into slices. As a consequence, the previously defined flags may be associated to several types of spatial subdivisions (slices, tiles etc.). Therefore, the skilled person may adapt the previous definitions to the possible configurations.

For example, when a tile contains more than one slice, the "previous_slices_availability_control" parameter and the "previous_tiles_available_for_current_ref_frame" flag define only the availability of the causal slices into the current tile.

In what follows, it is considered that the available area for the Inter prediction from the current frame is not the whole causal area.

For example, the available area for the Inter prediction from the current frame is explicitly signaled.

Figure 14:
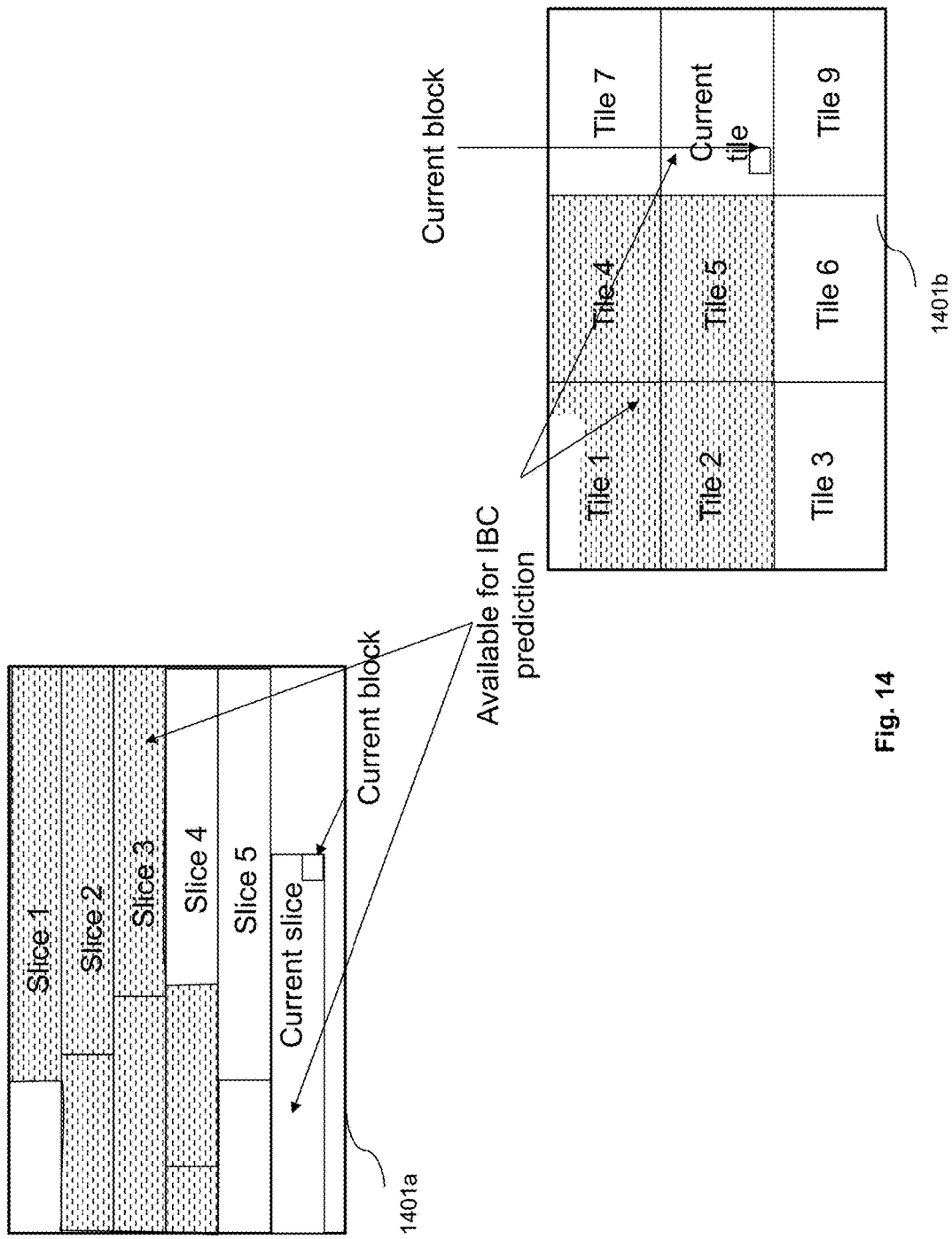

FIG. 14 illustrates a slice configuration (1401a). In this figure, the causal area of the current slice is available for the Inter prediction from the current frame. It is also available for the dashed area which contains a part of slice 1, slice 2, slice 3 and a part of slice 4.

In the HEVC standard a slice is defined only by the address of the first CTU of this slice. For a similar signaling, in the present example, in the slice header of the current slice, the first CTU of the available area is defined and the last included CTU of this area is defined.

Figure 15:
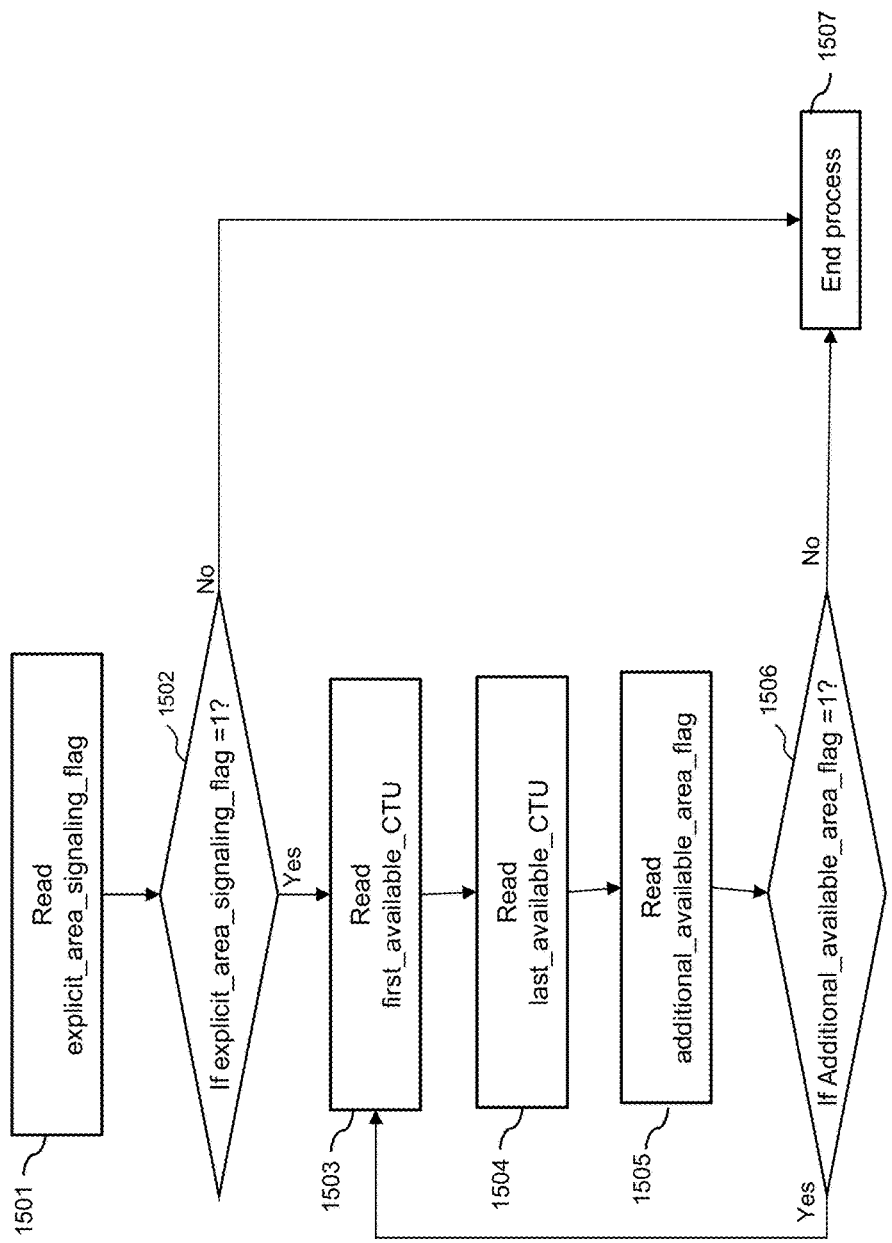

FIG. 15 is a flowchart of exemplary steps for defining this area. First, a flag "explicit_area_signaling_flag" (1501) is extracted from the bitstream to know (1502) if the related syntax of the area needs to be extracted. In such a case, the first CTU (1503) and the last included CTU are signaled (1503, 1504).

Next, a flag "additional_available_area_flag" (1505) is extracted from the bitstream to know if another available area is defined.

With this proposed syntax, several areas can be defined. For example, the defined area can be an area outside the top blocks or left blocks. It means that the block predictor can come from the bottom of the frame. In this case, the available area should be decoded independently from the current slice. This makes it possible to improve the coding efficiency.

According to embodiments, the only slice available for Inter prediction from the current frame is the first slice of the frame. In the present example, only one flag needs to be transmitted and the first slice can be transmitted on the network with a higher protection mechanism than other slices.

Figure 16:
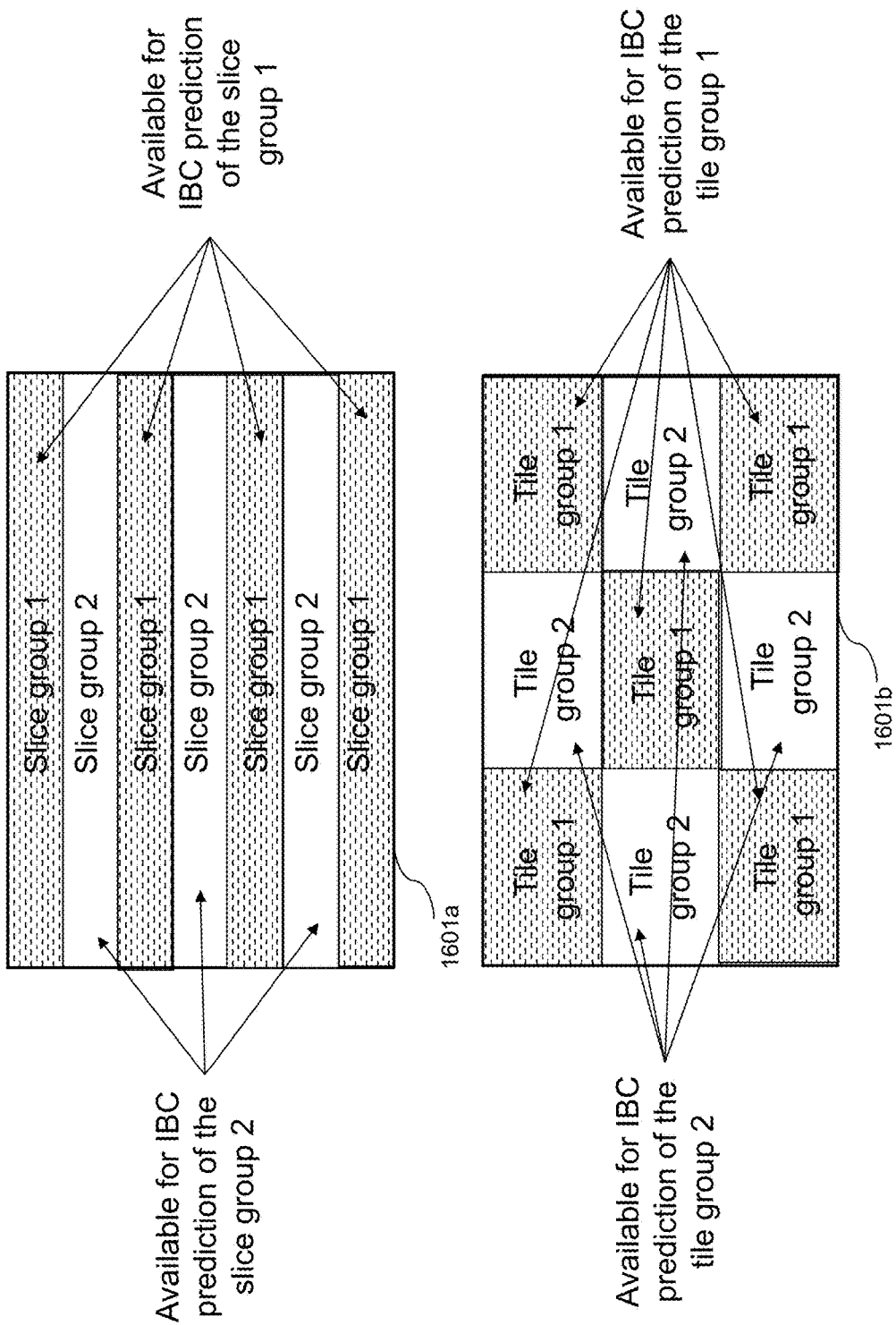

Alternatively, or in combination, some groups of slices are defined as illustrated in FIG. 16 (1601a) with two groups of slices. Each group contains one out of 2 slices. The available area for the Inter prediction from the current frame for each group is only the decoded slices of the current group. The number of groups per frame is transmitted at picture level and the group number of each slice can be implicitly (one out of 2 slices if 2 groups) or explicitly signaled. This makes it possible to keep the robustness and parallelism at slices group level.

The defined area can be an area outside the top blocks or left blocks. It means that the block predictor can come from the bottom of the frame. In this case, the available area should be decoded independently from the current slice. The slice decoding order can be not from the top to the bottom but in an alternative order. When these kinds of slice decoding order are used, the encoder shall take into account the dependencies between slices. These dependencies could be transmitted to the decoder. This embodiment should improve the coding efficiency.

The previous processing can be adapted to slice configurations.

For example, the available area for the Inter prediction from the current frame may be explicitly signaled.

This is illustrated in FIG. 14 (1401b). In this figure the causal area of the current tile is available for the Inter prediction from the current frame and also the dashed area which contains a part of tile 1, tile 2, tile 4 and tile 5.

Usually the decoding process of tile in performed a single process, should respect the order of tile number.

For example, the defined area can be an area outside the top blocks or left blocks. It means that the block predictor can come from the bottom of the frame. In this case, the available area is decoded independently from the current tile. This makes it possible to improve the coding efficiency.

Alternatively, or in combination, the only tile available for Inter prediction from the current frame is the first tile of the frame. In this case, only one flag needs to be transmitted and the first tile can be transmitted on the network with higher protection mechanism than the other tiles.

Groups of tiles may also be defined as illustrated in FIG. 16 (1601b) for 2 groups of tiles. Each group contains one out of 2 tiles, ordered as a checked pattern. The available area for the Inter prediction from the current frame for each group is only the decoded tiles of the current group. The number of groups per frame is transmitted at picture level and the group number of each tile can be implicitly (one out of 2 tiles if 2 groups) or explicitly signaled. This makes it possible to keep the robustness and parallelism at tiles group level.

The defined area can be also be an area outside the top blocks or left blocks. It means that the block predictor can come from the bottom of the frame. In that case, the available area should be decoded independently from the current tile. The tile decoding order can be different from the top to the bottom. The encoder shall take into account the dependencies between these tiles decoding orders. These dependencies could be transmitted to the decoder. This makes it possible to improve the coding efficiency.

Figure 17:
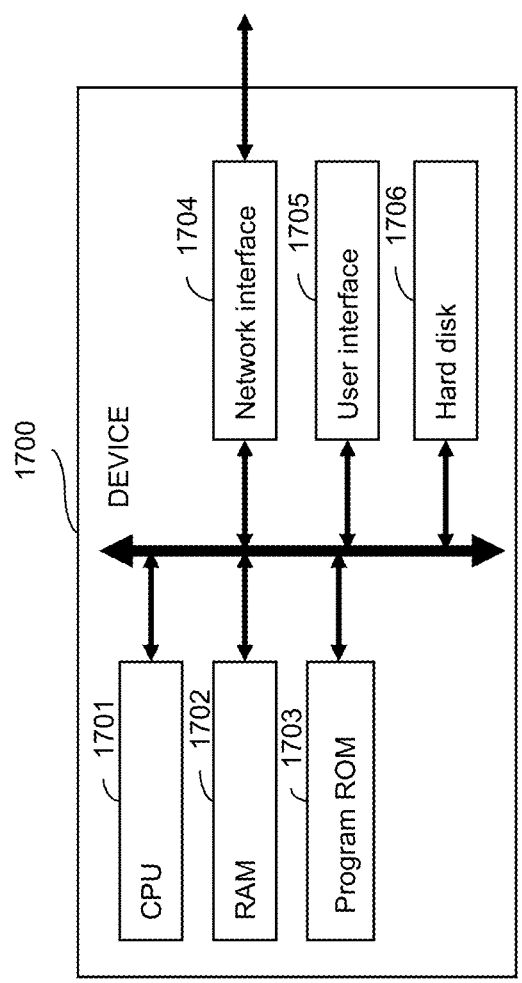
FIG. 17 schematically illustrates a device according to embodiments.

FIG. 17 is a schematic block diagram of a device 1700 for implementing of one or more embodiments of the invention. The device 1700 comprises a communication bus connected to:
  a central processing unit 1701, such as a microprocessor, denoted CPU;
  a random access memory 1702, denoted RAM, for storing the executable code of the method of embodiments of the invention as well as the registers adapted to record variables and parameters necessary for implementing a method according to embodiments, the memory capacity thereof can be expanded by an optional RAM connected to an expansion port for example;
  a read only memory 1703, denoted ROM, for storing computer programs for implementing embodiments of the invention;
  a network interface 1704 is typically connected to a communication network over which digital data to be processed are transmitted or received. The network interface 1704 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1701;
  a user interface 1705 for receiving inputs from a user or to display information to a user;
  a hard disk 1706 denoted HD
  an I/O module 1707 for receiving/sending data from/to external devices such as a video source or display The executable code may be stored either in read only memory 1703, on the hard disk 1706 or on a removable digital medium such as for example a disk. According to a variant, the executable code of the programs can be received by means of a communication network, via the network interface 1704, in order to be stored in one of the storage means of the communication device 1700, such as the hard disk 1706, before being executed.

The central processing unit 1701 is adapted to control and direct the execution of the instructions or portions of software code of the program or programs according to embodiments of the invention, which instructions are stored in one of the aforementioned storage means. After powering on, the CPU 1701 is capable of executing instructions from main RAM memory 1702 relating to a software application after those instructions have been loaded from the program ROM 1703 or the hard-disc (HD) 1706 for example. Such a software application, when executed by the CPU 1701, causes the steps of a method according to embodiments to be performed.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Certain aspects of the disclosure are set forth below:

Aspect 1. A decoding or encoding method wherein the spatial subdivisions are at least one of slices, tiles, tile rows, and tile columns.

Aspect 2. A decoding method wherein a motion vector is associated with a block of pixels of a current image,
  wherein the image is subdivided into spatial subdivisions,
  wherein the block of pixels belongs to a current spatial subdivision and is to be predicted using an Intra Block Copy mode, using a predictor block of pixels of the image designated by the motion vector, and the method further comprising decoding a localization parameter associated with the current spatial subdivision indicating an area of the current image to which the predictor block designated by the motion vector belongs.

Aspect 3. A method according to aspect 2, wherein the area may comprise any one of previously decoded spatial subdivisions in the current image.

Aspect 4. A method according to aspect 2 or 3, wherein the area is indicated by at least one pair of parameters indicating a first element in the area and a last element in the area.

Aspect 5. A method according to aspect 2 or 3, wherein the area is indicated by a repartition of the subdivision elements by groups.

Aspect 6. A method according to aspect 5, wherein the repartition is associated with the current image for all current subdivision elements.

Aspect 7. A method according to one of aspects 2 to 6, further comprising decoding a parameter indicating an order for decoding the spatial subdivisions of the image.

Aspect 8. A method according to one of aspects 2 to 7, wherein the spatial subdivisions are at least one of slices, tiles, tile rows, and tile columns.

Aspect 9. A method according to aspect 2, comprising decoding a parameter associated with the current image indicating a grouping of the spatial subdivisions according to a predetermined grouping pattern and wherein the predictor block is in a spatial subdivision of one of the groups of the grouping pattern.

Aspect 10. A method according to aspect 9, wherein the at least one group is a predefined group.

Aspect 11. A method according to aspect 9, further comprising decoding a parameter identifying the at least one group.

Aspect 12. An encoding method wherein a motion vector is associated with a block of pixels of a current image,
wherein the image is subdivided into spatial subdivisions,
wherein the block of pixels belongs to a current spatial subdivision and is to be predicted using an Intra Block Copy mode, using a predictor block of pixels of the image designated by the motion vector, and
the method further comprising encoding a localization parameter associated with the current spatial subdivision indicating an area of the current image to which the predictor block designated by the motion vector belongs.

Aspect 13. A method according to aspect 12, wherein the area may comprise any one of previously decoded spatial subdivisions in the current image.

Aspect 14. A method according to one of aspects 12 and 13, wherein the area is indicated by at least one pair of parameters indicating a first element in the area and a last element in the area.

Aspect 15. A method according to one of aspects 12 and 13, wherein the area is indicated by a repartition of the subdivision elements by groups.

Aspect 16. A method according to aspect 14, wherein the repartition is associated with the current image for all current subdivision elements.

Aspect 17. A method according to one of aspects 12 to 16, further comprising encoding a parameter indicating an order for decoding the spatial subdivisions of the image.

Aspect 18. A method according to one of aspects 12 to 17, wherein the spatial subdivisions are at least one of slices, tiles, tile rows, and tile columns.

Aspect 19. A method according to aspect 12, comprising associating a parameter with the current image indicating a grouping of the spatial subdivisions according to a predetermined grouping pattern and wherein the predictor block is in a spatial subdivision of one of the groups of the grouping pattern.

Aspect 20. A method according to aspect 19, wherein the at least one group is a predefined group.

Aspect 21. A method according to aspect 19, further comprising setting the parameter to a value identifying the at least one group.

Aspect 22. A device comprising a processing unit configured to perform the steps of a decoding method as described above.

Aspect 23. A device comprising a processing unit configured to perform the steps of an encoding method as described above.

Aspect 24. A system comprising:
a device comprising a processing unit configured to perform the steps of a decoding method according to one of aspects 2 to 11, and
a device comprising a processing unit configured to perform the steps of an encoding method according to one of aspects 12 to 21.

Aspect 25. A computer program product comprising instructions for implementing a decoding and/or encoding method as described above when the program is loaded and executed by a programmable apparatus.

Aspect 26. A non-transitory information storage means readable by a computer or a microprocessor storing instructions of a computer program, for implementing a decoding and/or encoding method as described above, when the program is loaded and executed by the computer or microprocessor.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A decoding method wherein a motion vector is associated with a block of pixels of a current image,
   wherein the image is subdivided into spatial subdivisions,
   wherein the block of pixels belongs to a current spatial subdivision and is to be predicted using an Intra Block Copy mode, using a predictor block of pixels of the image designated by the motion vector, and
   wherein the predictor block designated by the motion vector may belong to any one of previously decoded spatial subdivisions in the current image,
   the method further comprising the steps of:
   determining a value of a first flag associated with the current spatial subdivision, and
   determining, based on the determined value of the first flag, whether the predictor block is inside the current spatial subdivision or outside the current spatial subdivision,
   wherein the determined value of the first flag indicates that the predictor block is outside the current spatial subdivision when temporal prediction cannot be used for the current image.

2. The method according to claim 1, further comprising decoding in parallel the spatial subdivisions for which the predictor block is inside the spatial subdivision.

3. The method according to claim 1, further comprising decoding the spatial subdivisions for which the predictor block is outside the spatial subdivision after decoding the spatial subdivisions for which the predictor block is inside the spatial subdivision.

4. The method according to claim 1, further comprising determining a value of a second flag associated with a sequence of spatial subdivisions, the current spatial subdivision belonging to the sequence, and wherein the value of the first flag is determined when the value of the second flag is a specific value.

5. The method according to claim 1, comprising the following steps:
determining a value of a second flag associated with a sequence of spatial subdivisions, the current spatial subdivision belonging to the sequence,
determining, based on the determined value of the second flag, whether, for each block of pixels of each spatial subdivision of the sequence, the predictor block is inside the current each spatial subdivision or outside the each spatial subdivision.

6. The method according to claim 1, comprising the following steps:
determining a value of a second flag associated with a sequence of spatial subdivisions, the current spatial subdivision belonging to the sequence,
determining, based on the determined value of the second flag,
whether for each block of pixels of each spatial subdivision of the sequence, the predictor block is inside the current each spatial subdivision, or
whether for each block of pixels of each spatial subdivision of the sequence, the predictor block is outside the each spatial subdivision, or
whether it should be determined for each current spatial subdivision, based on a value of the first flag associated with the each current spatial subdivision, whether the predictor block is inside the each current spatial subdivision or outside the each current spatial subdivision.

7. An encoding method wherein a motion vector is associated with a block of pixels of a current image,
wherein the image is subdivided into spatial subdivisions,
wherein the block of pixels belongs to a current spatial subdivision and is to be predicted using an Intra Block Copy mode, using a predictor block of pixels of the image designated by the motion vector, and
wherein the predictor block designated by the motion vector may belong to any one of previously decoded spatial subdivisions in the current image,
the method further comprising the steps of:
associating a first flag with the current spatial subdivision,
setting a value of the first flag indicating whether the predictor block is inside the current spatial subdivision or outside the current spatial subdivision,
wherein the first flag is set to a value indicating that the predictor block is outside the current spatial subdivision when temporal prediction cannot be used for the current image.

8. The method according to claim 7, further comprising encoding in parallel the spatial subdivisions for which the predictor block is inside the spatial subdivision.

9. The method according to claim 7, further comprising encoding the spatial subdivisions for which the predictor block is outside the spatial subdivision after encoding the spatial subdivisions for which the predictor block is inside the spatial subdivision.

10. The method according to claim 7, further comprising associating a second flag with a sequence of spatial subdivisions, the current spatial subdivision belonging to the sequence, and setting a value of the first flag indicating when the value of the second flag is a specific value.

11. The method according to claim 7, wherein the first flag is set to a value indicating that the predictor block is inside the current spatial subdivision when temporal prediction can be used for the current image.

12. The method according to claim 7, wherein the first flag is set to a value indicating that the predictor block is inside the current spatial subdivision when a loss ratio of a network over which the current image is to be transmitted is above a predetermined value.

13. The method according to claim 7, wherein the first flag is set to a value indicating that the predictor block is outside the current spatial subdivision when a loss ratio of a network over which the current image is to be transmitted is below a predetermined value.

14. The method according to claim 7, comprising the following steps:
associating a second flag with a sequence of spatial subdivisions, the current spatial subdivision belonging to the sequence,
setting a value of the second flag indicating whether, for each block of pixels of each spatial subdivision of the sequence, the predictor block is inside the current each spatial subdivision or outside the each spatial subdivision.

15. The method according to claim 7, comprising the following steps:
associating a value of a second flag with a sequence of spatial subdivisions, the current spatial subdivision belonging to the sequence,
setting a value of the second flag indicating,
whether for each block of pixels of each spatial subdivision of the sequence, the predictor block is inside the current each spatial subdivision, or
whether for each block of pixels of each spatial subdivision of the sequence, the predictor block is outside the each spatial subdivision, or
whether it should be determined for each current spatial subdivision, based on a value of a first flag associated with the each current spatial subdivision, whether the predictor block is inside the each current spatial subdivision or outside the each current spatial subdivision.

16. A system comprising:
a device comprising a processing unit configured to perform a decoding method wherein a motion vector is associated with a block of pixels of a current image
wherein the image is subdivided into spatial subdivisions,
wherein the block of pixels belongs to a current spatial subdivision and is to be predicted using an Intra Block Copy mode, using a predictor block of pixels of the image designated by the motion vector, and
wherein the predictor block designated by the motion vector may belong to any one of previously decoded spatial subdivisions in the current image,
the decoding method further comprising the steps of:
determining a value of a first flag associated with the current spatial subdivision, and
determining, based on the determined value, whether the predictor block is inside the current spatial subdivision or outside the current spatial subdivision,
wherein the determined value of the first flag indicates that the predictor block is outside the current spatial subdivision when temporal prediction cannot be used for the current image and a device comprising a processing unit configured to perform an encoding method wherein a motion vector is associated with a block of pixels of a current image,
wherein the image is subdivided into spatial subdivisions,
wherein the block of pixels belongs to a current spatial subdivision and is to be predicted using an Intra Block Copy mode, using a predictor block of pixels of the image designated by the motion vector, and
wherein the predictor block designated by the motion vector may belong to any one of previously decoded spatial subdivisions in the current image,
the encoding method further comprising the steps of:
associating a first flag with the current spatial subdivision,
setting a value of the first flag indicating whether the predictor block is inside the current spatial subdivision or outside the current spatial subdivision,
wherein the first flag is set to a value indicating that the predictor block is outside the current spatial subdivision when temporal prediction cannot be used for the current image.

* * * * *